US008051379B2

(12) United States Patent
Iwata et al.

(10) Patent No.: US 8,051,379 B2
(45) Date of Patent: Nov. 1, 2011

(54) SYSTEM, APPARATUS, METHOD AND COMPUTER READABLE STORAGE MEDIUM FOR DISPLAYING INFORMATION RELATED TO AN IMAGE-FORMING APPARATUS CONNECTED TO A NETWORK

(75) Inventors: Yumiko Iwata, Yokohama (JP); Yoshiko Naito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 397 days.

(21) Appl. No.: 12/135,080

(22) Filed: Jun. 6, 2008

(65) Prior Publication Data

US 2008/0307319 A1 Dec. 11, 2008

(30) Foreign Application Priority Data

Jun. 8, 2007 (JP) ................................. 2007-152705
Oct. 11, 2007 (JP) ................................. 2007-265575

(51) Int. Cl.
*G06F 17/30* (2006.01)

(52) U.S. Cl. ........................................................ 715/744
(58) Field of Classification Search .................... 715/744
See application file for complete search history.

(56) References Cited

U.S. PATENT DOCUMENTS

| 7,467,841 B2 * | 12/2008 | Kamisuwa et al. ............. 347/19 |
| 2005/0141020 A1 * | 6/2005 | Harano ........................ 358/1.15 |
| 2006/0107212 A1 * | 5/2006 | Lovat et al. ................... 715/700 |

FOREIGN PATENT DOCUMENTS

| JP | 3-150643 A | 6/1991 |
| JP | 08-331174 | 12/1996 |
| JP | 2003-094609 | 4/2003 |
| JP | 2003-296082 A | 10/2003 |
| JP | 2005-165723 | 6/2005 |
| JP | 2006-092008 | 4/2006 |

* cited by examiner

*Primary Examiner* — Laurie Ries
*Assistant Examiner* — Tionna Smith
(74) *Attorney, Agent, or Firm* — Canon USA Inc. IP Division

(57) ABSTRACT

An image-forming apparatus includes a web browser and is connectable to a network. The image-forming apparatus includes a transmission unit configured to transmit a menu request including identification information of the image-forming apparatus, a reception unit configured to receive a response to the menu request from a management server via the network, an execution unit configured to analyze and execute a processing command included in content of the response received by the reception unit, and a display unit configured to generate a display file by embedding a processing result of the processing command executed by the execution unit into the content of the response received by the reception unit and to display the display file via the web browser.

13 Claims, 43 Drawing Sheets

EXAMPLE DATA TRANSMITTED
TO MANAGEMENT SERVER

EXAMPLE RESPONSE DATA
FROM MANAGEMENT SERVER

FIG.10

```
─ HTML FILE FOR DISPLAYING MENU PAGE 901
<HTML>
<HEAD>
    <title>MENU PAGE</title>

<!--ACQUIRE IMAGE FORMING APPARATUS ID AND MODEL NAME-->
    <script type="text/javascript" src="http://127.0.0.1/Servlet?dataName=DeviceID&dataModel=DeviceModel"></script>  ~1002
</HEAD>
<BODY>
    <H1>MENU LIST</H1>

<!--DISPLAY IMAGE FORMING APPARATUS ID AND MODEL NAME-->
    <script type="text/javascript">
    <!--
        document.write("ID:", DeviceID);   ~1003
        document.write(" MODEL NAME:", DeviceModel);  ~1004
    -->
    </script>

<!--DISPLAY MENU LIST-->   ........
</BODY>
</HTML>
```
~1001

FIG.11

| INFORMATION TO BE ACQUIRED | PARAMETER | |
|---|---|---|
| ID | DeviceID | ~1101 |
| MODEL NAME | DeviceModel | ~1102 |
| ERROR INFORMATION | Error | ~1103 |
| DEGREE OF PARTS CONSUMPTION | PartsCount | ~1104 |
| ⋮ | ⋮ | |

FIG.12

EXAMPLE PROCESSING RESULT OUTPUT FROM PROCESSING COMMAND EXECUTION UNIT var DeviceID="AAAAA";
var DeviceModel="Type777";

| ERROR CONTENT DETAILS | | 1701 |
|---|---|---|
| ID: AAAAA MODEL NAME: Type777 | | 1702 |
| CAUSE OF ERROR & RESOLUTION ERROR OCCURRED: 100 | | 1703 |

| | CAUSE | RESOLUTION |
|---|---|---|
| 1 | SCANNER BOARD ITSELF HAS EVER CAUSED ERROR. | CONFIRM SCANNER BOARD. |
| 2 | FREQUENT MALFUNCTIONS IN COMMUNICATION BETWEEN CONTROLLER BOARD AND SCANNER. | REPLACE CABLE. |

```
┌─ HTML FILE FOR DISPLAYING IMAGE FORMING APPARATUS INFORMATION PAGE 1601
<HTML>
<HEAD>
    <title>IMAGE FORMING APPARATUS INFORMATION</title>
<!--ACQUIRE IMAGE FORMING APPARATUS INFORMATION ID, MODEL NAME, ERROR INFORMATION, AND DEGREE-OF-PARTS-CONSUMPTION INFORMATION-->
<script type="text/javascript" src="http://127.0.0.1/Servlet?dataName=DeviceID
                    &dataName=PartsCount"></script> ~1802

<!--INSERT ACQUIRED INFORMATION INTO TRANSMISSION DATA-->
<script type="text/javascript" >
    function Input () {
        Submin. DeviceID. value=DeviceID;  ~1803
        Submin. DeviceModel.value=DiviceModel;
        Submin. Error. value=Error;
    }
</script>

</HEAD>
<BODY>
<H1>MENU LIST</H1>
<!--DISPLAY IMAGE FORMING APPARATUS ID AND MODEL NAME-->
<script type="text/javascript" >
<!--
    document.write("ID:", DeviceID);  ~1804
    document.write("MODEL NAME:", DeviceModel);  ~1805
-->
</script>

<!--DISPLAY CONFIRMATION INFORMATION LIST-->
<form name>="submitForm" action="ERROR CONTENT DETAILS PAGE"> ~1806
        <input type="submit" name="submit" value="ERROR CONTENT DETAILS" onClick="Input()" >
1807~   <input type="hidden" name="DeviceID" value="" >
        <input type="hidden" name="DeviceModel" value="" > ~1808
        <input type="hidden" name="Error" value="" >
                                                            1809
    </form>
</BODY>
</HTML>
```

FIG.19

EXAMPLE PROCESSING RESULT OUTPUT FROM PROCESSING COMMAND EXECUTION UNIT ~1901

```
var DeviceID="AAAAA";
var DeviceModel="Type777";
var Error="100";
Var PartsCount=Array(NumOfParts);
PartsCount[0]=30000;
PartsCount[1]=26000;
          ⋮
```

FIG.21

JAM/ALARM HISTORY — 2101

ID: AAAAA  MODEL NAME: Type777 — 2102

JAM HISTORY

| DATE | CONTENT | RESOLUTION |
|---|---|---|
| 2007/01/01 | JAM 300 | FINISHED |
| 2007/03/03 | JAM 800 | UNFINISHED |
| ⋮ | ⋮ | ⋮ |

| To Do List |
|---|
| Start Time 2007/05/11 12:45 |
| ●    Service Call Details    ~2404 |
| ●    Replacement Part Details    ~2405 |
|      Operational History    ~2406 |

FIG.26

| Service Call Details | | |
|---|---|---|
| Code | Details | Analysis Results |
| E540(8001) | The rise and fall error of the tray | Display ~2407 |
| back | | |

| Replacement Parts | | | | |
|---|---|---|---|---|
| Part Code | Part Counter Value | Degree of part Consumption | Replacement Steps | ~2417 |
| SCN-BOARD | 712100 | 95% | display ~2409 | |
| CABLE | 712100 | 38% | display ~2410 | |

Cause and Resolution

The seven methods of dealing with the error has been described in the Service Manuals. According to the operational history, two methods are selected.

| | Cause | Resolution | |
|---|---|---|---|
| 1 | The standard tray has been operated, however, the surface of copy paper was unable to be detected. | 1. Check the home position sensor connector of the standard tray. | ~2418 |
| | | 2. Replace the home position sensor of the standard tray with a new one. | | back ~2411

FIG.29

| Operational History | | | |
|---|---|---|---|
| Date | Engineering Operation | Engineer Name | Counter Value |
| 2006/12/01 | K-ROLL Replacement | Aaaa | 689 |
| 2007/01/05 | CLR-UNIT Replacement | Aaaa | 1082 | back ~2415

FIG.30

Create Engineer Operational Report — 2419

Date: 2007/02/13 Start Time: 12:05 Finish Time: 13:30

Dispatch Type — 2420

| ☐ Periodical Visit | ☐ Repair | ☐ Consumable Delivery |
|---|---|---|
| ☐ Other | | |

2421

Engineering Operation

| ☐ Poor Image Quality | ☐ Jam | ☐ Error |
|---|---|---|
| ☐ Part Replacement | ☐ Mechanical Noise | |
| ☐ Other | | |

2422

Error

| E733-0001 | ☐ Handled | ☐ Not Handled |
|---|---|---|

2423

Replacement Parts

| ☐ Drum | ☐ Optical Area | ☐ Cleaner |
|---|---|---|
| ☐ Transport Area | ☐ Developing Area | ☐ Fixing/Delivery Area |
| ☐ Pick up Area | ☐ Charging Wire | |

2424

Replacement Reason

| ☐ xxxx Inc. Recommended Lifetime | ☐ Scratch | ☐ Broken |
|---|---|---|
| ☐ Other | | |

[ Create Report ] — 2415    [ back ] — 2416

FIG.32

| Part Code | Part Counter Value | Degree of part Consumption | Replacement Steps |
|---|---|---|---|
| SCN-BOARD | 712100 | 95% | display |
| CABLE | 712100 | 38% | display |

Display Replacement Parts Details back

FIG.35

OPERATIONAL REPORT

| OPERATION DATE | 2007/6/12 | START TIME | 12:05 | ENGINEER'S ID | A000 |
|---|---|---|---|---|---|
| REASON FOR OPERATION | REPAIR | FINISH TIME | 12:45 | ENGINEER'S NAME | A |
| SALES DIVISION ID | AAA01 | DEVICE ID | 0000MLX14080 | RDS ID | AAA01001 |
| SALES DIVISION NAME | AAA Inc. | MODEL NAME | iR C5180i | RDS SETUP DATE | 2006/3/3 |
|  |  | DEVICE SETUP DATE | 2006/10/1 |  |  |
| CLIENT ID | aaaaa0001 | BUILDING NAME | N/A | | |
| CLIENT NAME | aaaIne. | ADDRESS 1 | 53 IMAIUE-MACHI, NAKAHARA-KU, KAWASAKI-SHI | | |
|  |  | ADDRESS 2 | KANAGAWA-KEN | | |
|  |  | POSTAL CODE | 211-8501 | | |

~3501 (top section)
~3502 (client section)

~3503

ERROR

| ERROR RESOLUBLE BY CLIENT | 0 | ALARM | 0 |
|---|---|---|---|
| ERROR REQUIRING RESOLUTION BY ENGINEER | 1 | JAM | 0 |

COUNTER

|  | TOTAL | MONOCHROME | OVERLAY | TWO-SIDED | DOCUMENT FEEDER |
|---|---|---|---|---|---|
| LARGE SIZE | 50834 | 4666 | 0 | 22040 | 1800 |
| SMALL SIZE | 357513 | 41412 | 0 | 138526 | 52100 |

FIRMWARE VERSION

| TYPE | NAME | VERSION |
|---|---|---|
| 01 | Document Feeder | 01.00 |
| 02 | Finisher | 04.01 |
| 04 | Main | 21.01 |
| 05 | Scan | 01.02 |
| 06 | Print | 04.01 |
| 07 | Fax Board | 00.00 |
| 0A | Boot Rom | 04.01 |

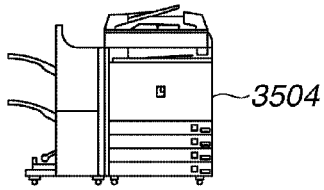
~3504

OPERATIONAL CONTENT

| PHENOMENON | DETAILS | ACTION | NOTE | RESOLUTION STATE |
|---|---|---|---|---|
| ERROR E540(8001) | TRAY ELEVATION ERROR | ERROR CLEAR |  | RESOLVED |
| PARTS REPLACEMENT | PHOTO INTERRUPTER, TLP1243 RECOMMENDED LIFETIME | PHOTO INTERRUPTER, TLP1243 (No. WG8-5696-000) REPLACEMENT |  | RESOLVED |
| PARTS REPLACEMENT | FLAG, PAPER SENSING SENSOR RECOMMENDED LIFETIME | FLAG, PAPER SENSING SENSOR (No. 4A3-4308-000) REPLACEMENT |  | RESOLVED |

FIG.37A

```xml
<?xml version='1.0' encoding='UTF-8'?>
<SOAP-ENV:Envelope
xmlns:SOAP-ENV="http://schemas.xmlsoap.org/soap/envelope/"
xmlns:xsi="http://www.w3.org/2001/XMLSchema-instance"
xmlns:xsd="http://www.w3.org/2001/XMLSchema">
<SOAP-ENV:Body>
<ns1:postPrintOutCounter xmlns:ns1="server"
SOAP-ENV:encodingStyle="http://schemas.xmlsoap.org/soap/encoding/">
<device xsi:type="ns2:deviceIdentifyType"
xmlns:ns2="http://www.xxxx.com/ns/active/maintenance">
<serialNumber xsi:type="xsd:string">MLX14080</serialNumber>
<counter xsi:type="xsd:long">15960</counter>
</device>
<timeStamp xsi:type="xsd:dateTime">
2007-02-13T13:40:05.000Z
</timeStamp>
</ns1:postPrintOutCounter>
</SOAP-ENV:Body>
</SOAP-ENV:Envelope>
```

FIG.37B

```xml
<?xml version='1.0' encoding='UTF-8'?>
<SOAP-ENV:Envelope
xmlns:SOAP-ENV="http://schemas.xmlsoap.org/soap/envelope/"
xmlns:xsi="http://www.w3.org/2001/XMLSchema-instance"
xmlns:xsd="http://www.w3.org/2001/XMLSchema">
<SOAP-ENV:Body>
<ns1:postErrorInformation xmlns:ns1="server"
SOAP-ENV:encodingStyle="http://schemas.xmlsoap.org/soap/encoding/">
<device xsi:type="ns2:deviceIdentifyType"
xmlns:ns2="http://www.xxxx.com/ns/active/maintenance">
<serialNumber xsi:type="xsd:string">MLX14080</serialNumber>
<occurrenceTime
xsi:type="xsd:dateTime">2007-02-13T13:39:00.000Z</occurrenceTime>
<revertState xsi:type="xsd:short">1</revertState>
<revertTime
xsi:type="xsd:dateTime">1970-01-01T00:00:00.000Z</revertTime>
<totalCount xsi:type="xsd:long">15950</totalCount>
<errorType xsi:type="xsd:short">1</errorType>
<code xsi:type="xsd:long">1344</code>
<subcode xsi:type="xsd:long">8001</subcode>
<position xsi:type="xsd:short">3</position>
</device>
<timeStamp xsi:type="xsd:dateTime">
2007-02-13T13:40:05.000Z
</timeStamp>
</ns1:postErrorInformation>
</SOAP-ENV:Body>
</SOAP-ENV:Envelope>
```

FIG.43

|  | 4301 |
|---|---|
| NUMBER OF CODES | |

| CODE (4303) | SUBCODE (4304) | COUNTERMEASURE TABLE START NO. (4305) | COUNTERMEASURE TABLE ENTRY NUMBER (4306) |
|---|---|---|---|
| 540 | 8001 | 1 | 7 |
|  |  |  |  |
|  |  |  |  |
|  |  |  |  |
|  |  |  |  |

4302

| No. (4308) | CHARACTER STRING INDICATING RESOLUTION METHOD (4309) | REPLACEMENT PARTS (4310) | PHENOMENON (4311) |
|---|---|---|---|
| 1 | CHECK PAPER SURFACE SENSING SENSOR CONNECTOR OF STACK TRAY | NOTHING | |
| 2 | REPLACE PAPER SURFACE SENSING SENSOR OF STACK TRAY | WG8-5696-00/PHOTO INTERRUPTER, TLP1234 4A3-4308-000/FLAS, PAPER SENSING SENSOR | |
| 3 | | | |
| 4 | | | |
| 5 | | | |
| 6 | | | |
| 7 | | | |

4307

SYSTEM, APPARATUS, METHOD AND COMPUTER READABLE STORAGE MEDIUM FOR DISPLAYING INFORMATION RELATED TO AN IMAGE-FORMING APPARATUS CONNECTED TO A NETWORK

BACKGROUND OF THE INVENTION

1. Field of the Invention

The present invention relates to a management system for an image-forming apparatus connected to a network.

2. Description of the Related Art

A management system can manage operational statuses of various image-forming apparatuses (printers, copying machines, multifunction peripherals, etc.) which are located at various locations. The management system collects operational status information from image-forming apparatuses and provides services according to each operational status.

One of the services provided by a management system is to present a resolution method that suits for a failure having occurred in an image-forming apparatus. As discussed in Japanese Patent Application Laid-Open No. 2003-296082, if any error occurs in an image-forming apparatus, the image-forming apparatus automatically starts error resolution processing or automatically presents a manual resolution method to a user.

According to this conventional method, the server performs a centralized management of error resolution programs and manual resolution methods. If any error occurs in an image-forming apparatus, the image-forming apparatus transmits error information to the server. The server transmits a response including a resolution program relating to the notified error to the image-forming apparatus. The image-forming apparatus executes the received resolution program to enable the system to recover from failure without relying on a user's support.

Furthermore, as discussed in Japanese Patent Application Laid-Open No. 3-150643, a supervisory control system performs remote supervisory control for an information-processing system and, if any failure information is received, generates a processing procedure for enabling the information-processing system to recover from failure.

According to this conventional method, the supervisory control system collates the obtained failure information with failure precedents stored in its server. Then, if there is any failure precedent according with the obtained failure information, the supervisory control system generates a recommendable failure recovery procedure and transmits the generated recovery procedure to the information-processing system. Therefore, an appropriate recovery procedure can be presented to a service engineer when the service engineer arrives at a location where the information-processing system is located.

In an image-forming apparatus management system, if any failure occurs in an image-forming apparatus, the image-forming apparatus notifies a management server of the occurrence of a failure. The management server accumulates notified information (e.g., failure contents). For example, the management server provides a portal screen that enables an administrator to view supervisory information of an image-forming apparatus and to dispatch a service engineer to the location where the information-processing apparatus is located.

When a service engineer arrives at a client office or facility, the first thing the service engineer needs to do is to check the content of failure and resolution method(s) such as cause(s) and operational procedure(s). However, due to security enhancement in a recent work environment, service engineers are not basically allowed to bring a portable computer into a client's office or facility where a failed image-forming apparatus is located. Furthermore, it is generally difficult for a service engineer to use a client's computer during a repair or maintenance work for the failed image-forming apparatus.

According to the conventional system discussed in Japanese Patent Application Laid-Open No. 2003-296082, the information that the server can supply to a user is limited to error resolution program(s) and manual resolution method(s) that suit for errors having ever occurred in image-forming apparatuses. However, the repair or maintenance work at an image-forming apparatus performed by a service engineer is not limited to failure recovery operations. To check every performance of an image-forming apparatus, a service engineer is required to be frequently communicate with a management server to obtain various information and data for the image-forming apparatus.

If it is difficult for a service engineer to access a management server to view image-forming apparatus information, the service engineer checks necessary information and prepares documents and related things beforehand. However, it is impossible for a service engineer to prepare all of the necessary documents including any documents necessary for possible events occurring at the location where the service engineer works. Furthermore, if a service engineer immediately requires a specific document that is not prepared, there is no way for the service engineer to get it.

To reduce such a burden placed on a service engineer, it is desired to establish a system capable of easily viewing necessary information (type of failure, cause of failure, resolution method, etc.) at the location where a failed image-forming apparatus is located. In addition, it is desired to establish a system that enables an administrator to easily view and confirm the information about maintenance processing performed by a service engineer.

Furthermore, before a service engineer visits a client office or facility, the service engineer reads a service manual (document prepared for a service engineer), which describes resolution methods in association with various failures to enable each service engineer to accurately know the contents of failures and resolution methods (causes, operational procedures, etc.), and prepares necessary replacement parts and tools according to the service manual.

According to the conventional system discussed in Japanese Patent Application Laid-Open No. 3-150643, the supervisory control system generates resolution method(s) upon detecting the occurrence of a failure and promptly transmits the generated resolution method(s) to a failed information-processing system. However, other failure may occur after a service engineer has been dispatched to a client's office or facility. In such a case, it is difficult to notify the service engineer of information relating to a newly occurred failure. Furthermore, a service engineer completes a maintenance work by summarizing maintenance results into an operational report (a report describing the contents of operations having been done). In any case, a service engineer is required to return and come again with necessary information newly acquired.

SUMMARY OF THE INVENTION

Embodiments of the present invention are directed to an image-forming apparatus and an information-processing method that enable a service engineer to view necessary information on a display panel of the image-forming apparatus and to perform a maintenance work efficiently.

According to an aspect of the present invention, an image-forming apparatus includes a web browser and is connectable to a network. The image-forming apparatus includes a transmission unit configured to transmit a menu request including identification information of the image-forming apparatus, a reception unit configured to receive a response to the menu request from a management server via the network, an execution unit configured to analyze and execute a processing command included in content of the response received by the reception unit, and a display unit configured to generate a display file by embedding a processing result of the processing command executed by the execution unit into the content of the response received by the reception unit and to display the display file via the web browser.

Further features and aspects of the present invention will become apparent from the following detailed description of embodiments with reference to the attached drawings.

BRIEF DESCRIPTION OF THE DRAWINGS

Embodiments of the present invention will now be described, by way of example only, with reference to the accompanying drawings in which:

FIG. 10 illustrates an example Hyper Text Markup Language (HTML) file that the web browser receives from the management server according to the first embodiment.

FIG. 11 illustrates an example parameter list transmitted from the web browser to an information acquisition program of the image-forming apparatus according to the first embodiment.

FIG. 12 illustrates an example processing result output from an image-forming apparatus that executes the information acquisition program according to the first embodiment.

FIG. 17 illustrates an example display screen that displays a menu received from the management server when the web browser transmits image-forming apparatus information to the management server according to the second embodiment.

FIG. 18 illustrates an example HTML file that the web browser receives from the management server according to the second embodiment.

FIG. 19 illustrates an example processing result output from an image-forming apparatus that executes the information acquisition program according to the second embodiment.

FIG. 21 illustrates an example display screen displayed when the web browser receives a menu from the management server according to a third embodiment of the present invention.

FIG. 25 illustrates an example menu screen that enables a service engineer to refer to information required for a maintenance operation according to an embodiment of the present invention.

FIG. 26 illustrates an example screen that displays detailed failure information according to an embodiment of the present invention.

FIG. 27 illustrates an example screen that displays failure analysis result(s) and resolution method(s) according to an embodiment of the present invention.

FIG. 29 illustrates an example display screen that displays an operational history according to an embodiment of the present invention.

FIG. 30 illustrates an example screen that displays an operational report creation according to an embodiment of the present invention.

FIG. 32 illustrates an example display screen that displays detailed parts replacement information according to an embodiment of the present invention.

FIG. 35 illustrates an example operational report generated by the management server according to an embodiment of the present invention.

FIGS. 37A and 37B illustrate example data transmitted by an image-forming apparatus, which executes the image-forming apparatus supervisory program, according to an embodiment of the present invention.

FIG. 43 illustrates an example failure resolution method table provided by the management server according to an embodiment of the present invention.

DETAILED DESCRIPTION OF THE EMBODIMENTS

Figure 1:
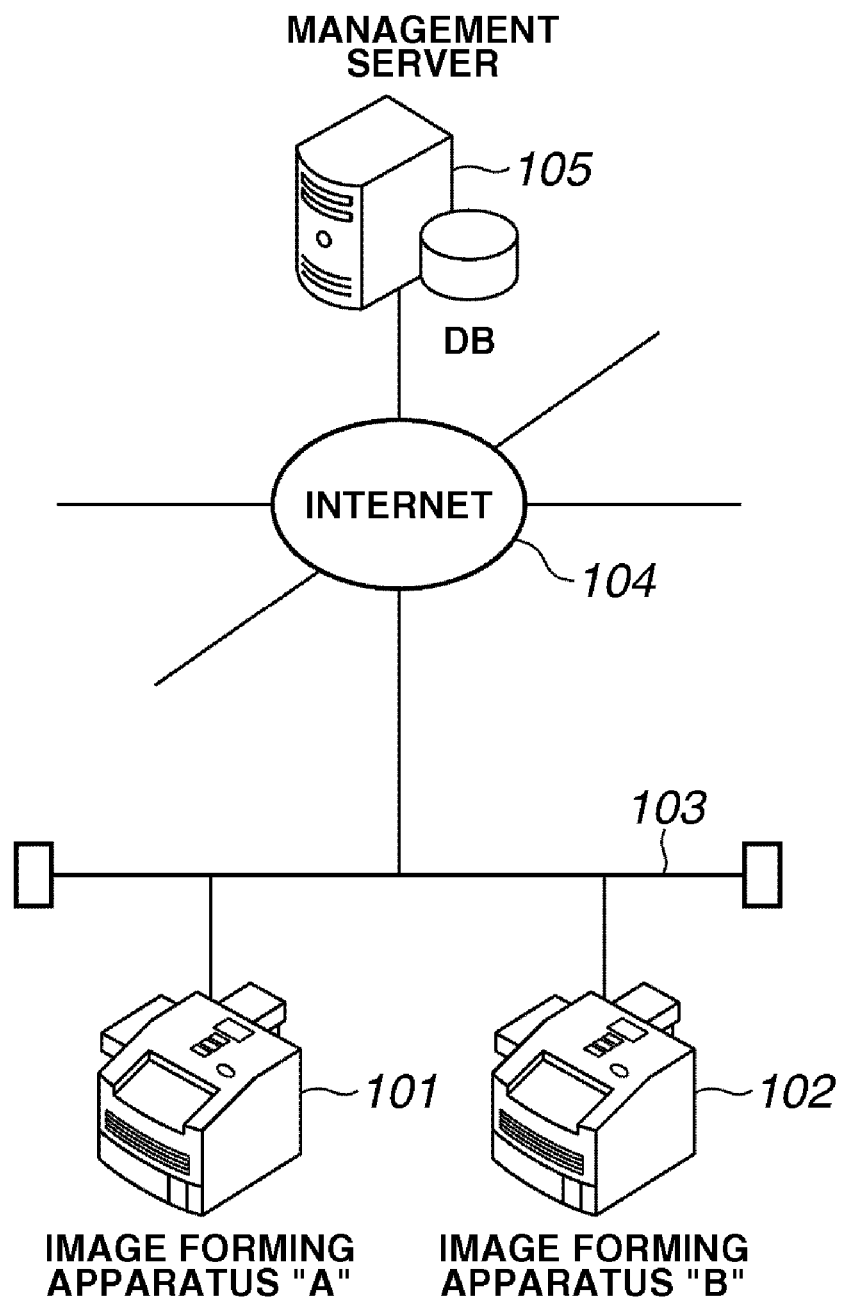
FIG. 1 illustrates an example network configuration including image-forming apparatuses and a management server connected via the Internet according to an embodiment of the present invention.

The following description of embodiments is illustrative in nature and is in no way intended to limit the invention, its application, or uses. It is noted that throughout the specification, similar reference numerals and letters refer to similar items in the following figures, and thus once an item is described in one figure, it may not be discussed for following figures. Embodiments will be described in detail below with reference to the drawings.

First Embodiment

An example network configuration illustrated in FIG. 1 includes a plurality of image-forming apparatuses 101 and 102, such as a multifunction peripheral (MFP) having print, scanner, copy, and facsimile functions or a single function peripheral (SFP), connected to a client's network.

A management server 105 is connected to each image-forming apparatus via a firewall (not illustrated). The management server 105 performs transmission/reception of data with the image-forming apparatuses 101 and 102 connected to a network 103. Furthermore, the management server 105 can perform transmission/reception of data with other image-forming apparatuses (not illustrated). The management server 105 manages information received from each image-forming apparatus. The firewall protects each image-forming apparatus (object to be managed) connected to the client network against any unauthorized access from an external device, thereby enhancing the security.

In this embodiment, the image-forming apparatuses 101 and 102 are connected to the same network (local area network (LAN)) 103. However, the image-forming apparatuses 101 and 102 can be connected to any other network (external LAN) accessible via the Internet 104.

Figure 2:
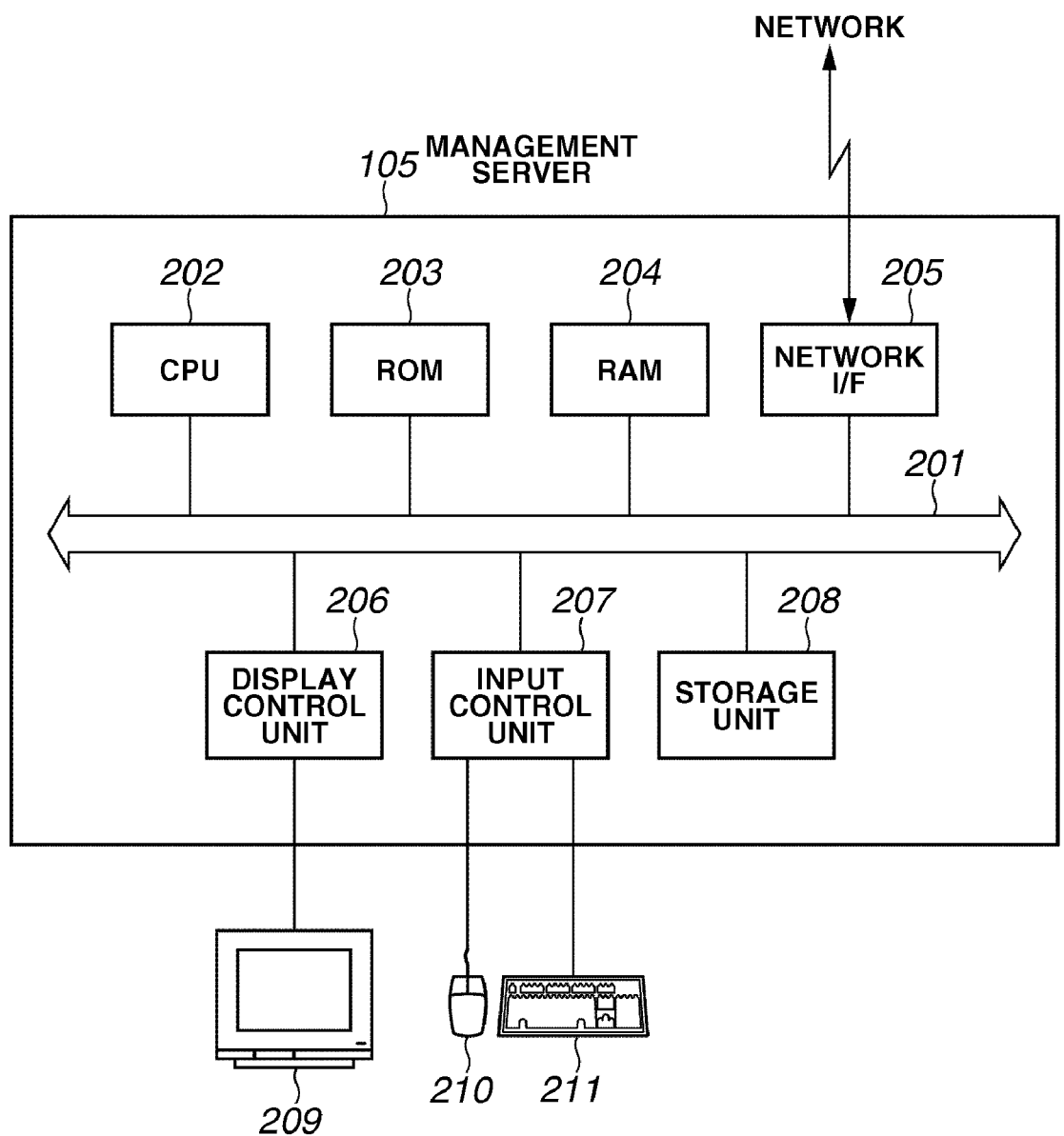
FIG. 2 is a block diagram illustrating an example hardware configuration of the management server according to an embodiment of the present invention.

FIG. 2 is a block diagram illustrating an example hardware configuration of the management server 105.

The management server 105 is, for example, a general computer. The management server 105 includes a central processing unit (CPU) 202, a read-only memory (ROM) 203, a random access memory (RAM) 204, a network interface (I/F) 205, a display control unit 206, an input control unit 207, and a storage unit 208, which are connected via a system bus 201. The CPU 202 controls various operations performed by the management server 105. The ROM 203 stores a boot program required when the system starts its operations. The RAM 204 serves as a work memory for the CPU 202, which executes program(s). The management server 105 can communicate via the network I/F 205 with an external device accessible via a network. The storage unit 208 stores program(s) that the CPU 202 can execute as well as operational information of each image-forming apparatus.

The display control unit 206 is connected to a display device 209. The input control unit 207 is connected to input devices 210 and 211. An operator of the management server 105 can confirm an operational state of the management server 105 or instruct operation(s) via these input/output devices.

The management server 105 can manage various image-forming apparatus information including basic information, such as identifier (hereinafter, referred to as "ID") of each image-forming apparatus, firmware type of each image-forming apparatus, and model type of each image-forming apparatus. Furthermore, the management server 105 can manage error/alarm/jam or other failure information as well as information relating to the degree of parts consumption. The management server 105 manages various types of information relating to each image-forming apparatus in association with the ID allocated to the image-forming apparatus, which are stored in the storage unit 208. Furthermore, the management server 105 stores an image-forming apparatus ID management table (not illustrated) that lists identification information of all image-forming apparatuses currently managed.

Furthermore, the information representing an abnormal state of an image-forming apparatus managed by the management server 105 includes, in addition to operational information, error/alarm information representing hardware failure or jam. If the management server 105 receives this information from an image-forming apparatus, the management server 105 determines processing to be performed according to an emergency level of the information. If the received information is failure information notifying any failure (or any other abnormal state) of an image-forming apparatus, which requires immediate recovery, the management server 105 transmits an electronic mail to an operator who manages the image-forming apparatus (object to be managed). Furthermore, the management server 105 successively stores the content of received failure information in the storage unit 208 and causes the display unit 209 to display the content of the failure to let an operator know an abnormal state having occurred in the image-forming apparatus.

On the other hand, if the received information is jam or alarm having a lower emergency level, the management server 105 successively stores the received information in the storage unit 208. The management server 105 determines whether to transmit an electronic mail and/or display the failure content on the display unit 209 according to the failure. An operator determines a current state of the image-forming apparatus based on the content displayed by the display unit 209 and, if necessary, instructs a service engineer to perform a failure recovery operation at the location where the failed image-forming apparatus is located.

Figure 3:
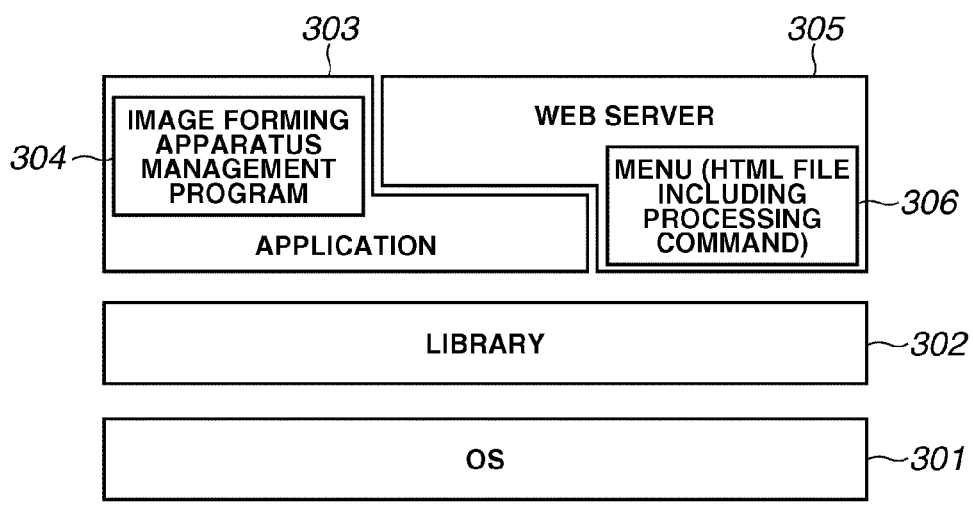
FIG. 3 is a block diagram illustrating an example software configuration of the management server according to an embodiment of the present invention.

FIG. 3 is a block diagram illustrating an example software configuration of the management server 105. The CPU 202, when the system starts its operation, reads a system startup program (not illustrated) from the ROM 203 and starts the operation. Furthermore, the CPU 202 executes a program loaded from the storage unit 208 into the RAM 204. The software configuration illustrated in FIG. 3 includes an operating system (OS) 301, a library 302, an application 303, and a web server 305.

The application 303 includes a management program 304 that manages the image-forming apparatuses 101 and 102 connected to the Internet 104. The web server 305 includes a plurality of menus 306 including processing commands that can be supplied to the image-forming apparatuses 101 and 102. The web server 305 can transmit/receive message(s) to/from the image-forming apparatuses 101 and 102 via the Internet 104. The web server 305 analyzes a menu request message received from the image-forming apparatus 101 (or 102) and selects a menu corresponding to the received menu request.

The menu according to an embodiment is a Hyper Text Makeup Language (HTML) file, which includes processing command(s) requesting acquisition of various information of the image-forming apparatus.

Figure 4:
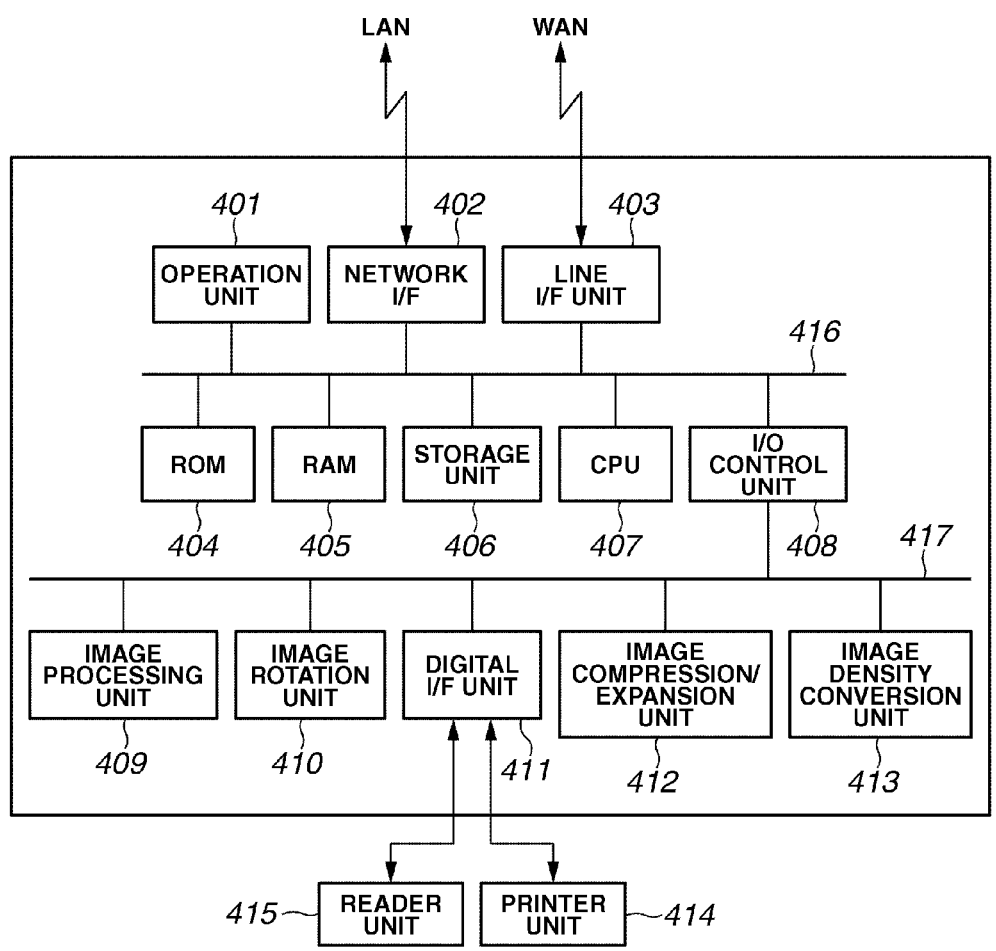
FIG. 4 is a block diagram illustrating an example hardware configuration of an image-forming apparatus according to an embodiment of the present invention.

FIG. 4 is a block diagram illustrating an example hardware configuration of the image-forming apparatus 101, which includes constituent components connected with each other via a system bus 416 or an image bus 417.

A read-only memory (ROM) 404 stores an image-forming apparatus control program and an image-forming apparatus supervisory program, which a CPU 407 can execute.

The image-forming apparatus supervisory program according to an embodiment is incorporated in an image-forming apparatus or can be incorporated in another supervisory apparatus that can acquire information from the image-forming apparatus via a network.

A random access memory (RAM) 405 serves as a work memory area for the CPU 407, which executes the program(s). The RAM 405 also functions as an image memory that temporarily stores status information of the image-forming apparatus and image data, which are necessary for the management performed according to the management program. A storage unit 406 is a nonvolatile storage device, which stores an ID and operation log(s) that are necessary when the image-forming apparatus 101 restarts its operation.

A network I/F 402 is an interface unit, which enables the image-forming apparatus 101 to perform communication with the management server 105 via a LAN. A line I/F unit 403 is connected to an Integrated Services Digital Network (ISDN) or a public telephone network and operable under the control of a communication control program stored in the ROM 404. The line I/F unit 403 enables the image-forming apparatus 101 to perform transmission/reception of data with a remote terminal via an ISDN I/F, a modem, or a network control unit (NCU).

Furthermore, the line I/F unit 403 enables the image-forming apparatus 101 to transmit or receive a facsimile signal. An operation unit 401 includes a display unit and a key input unit, which are controlled by the CPU 407. The key input unit enables an operator to input various setting instructions relating to scanning and printout processing or operation/stop instructions.

The above-described functional units of the image-forming apparatus 101 are connected to the system bus 416.

An I/O control unit 408 is a bus bridge connecting the system bus 416 to the image bus 417, which can speedily transfer image data. The image bus 417 includes a PCI bus or an IEEE1394 bus. The image-forming apparatus 101 includes the follows functional units connected to the image bus 417.

A digital I/F unit 411 enables the I/O control unit 408 to communicate with a reader unit 415 and a printer unit 414. The digital I/F unit 411 performs synchronous/asynchronous conversion for image data. The sensing information detected by the above-described various sensors disposed in the reader unit 415 or the printer unit 414 can be supplied to the system bus 416 via the digital I/F unit 411 and the I/O control unit 408. An image-processing unit 409 performs correction/modification/editing processing on input/output image data. An image rotation unit 410 rotates image data. An image compression/expansion unit 412 performs Joint Photographic Experts Group (JPEG) compression/expansion processing for multi-value image data and JBIG/MMR/MR/MH compression/expansion processing for binary image data. An image density conversion unit 413 performs resolution conversion on image data to be output.

When the CPU 407 executes the control program, the CPU 407 reads operational information and failure information, such as counter values and operation logs, stored in the storage unit 406. The CPU 407 transmits the read information (operational information and failure information), as status information of the image-forming apparatus, to the management server 105 via the network I/F 402.

Figure 5:
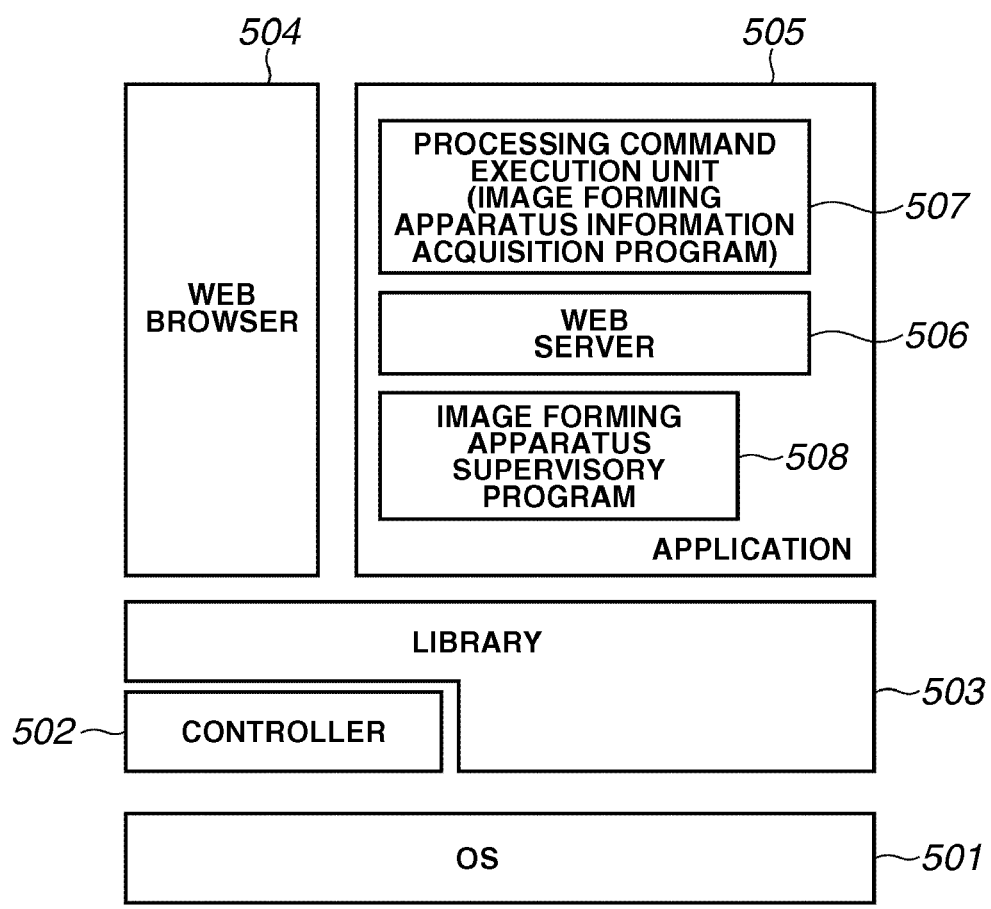
FIG. 5 is a block diagram illustrating an example software configuration of an image-forming apparatus according to an embodiment of the present invention.

FIG. 5 illustrates an example software configuration of the image-forming apparatus 101, which includes an operating system (OS) 501, a controller 502, a library 503, a web browser 504, and an application 505. The CPU 407, when the system starts operation, reads a system startup program (not illustrated) from the ROM 404 and starts an operation. Furthermore, the CPU 407 loads a program from the storage unit 406 to the RAM 405 and executes the program.

The web browser 504 performs transmission/reception of message(s) with the management server 105 via the Internet 104. The web browser 504 analyzes a menu included in a reply message received from the management server 105 responding to a menu request. If the received menu request includes a processing command, the web browser 504 transmits the processing command to a processing command execution unit 507 and receives a processing result from the processing command execution unit 507.

In this embodiment, the processing command execution unit 507 is a module operable based on an image-forming apparatus information acquisition program. Furthermore, the web browser 504 generates a display screen by embedding the processing result received from the processing command execution unit 507 into a designated area on the menu received from the management server 105. The web browser 504 causes the operation unit 401 of the image-forming apparatus 101 to display the generated display screen.

The application 505 includes a web server 506 and an image forming apparatus supervisory program 508 in addition to the processing command execution unit 507. The processing command execution unit 507 acquires various types of information relating to the image-forming apparatus 101 from the controller 502.

The web server 506 activates the processing command execution unit 507 in response to a processing command transmitted from the web browser 504 and transmits the processing result to the web browser 504.

The processing command execution unit 507 acquires various types of information from the image-forming apparatus via the controller 502. The image-forming apparatus information includes basic information of the image-forming apparatus (e.g., ID of image-forming apparatus, firmware type of image-forming apparatus, and model type of image-forming apparatus), as well as error/alarm/jam information and degree-of-parts-consumption information.

The image-forming apparatus supervisory program 508 acquires various types of information from the image-forming apparatus via the controller 502. The image forming apparatus supervisory program 508 periodically acquires the information relating to firmware type, number of printed sheets, and degree of parts consumption and transmits the acquired information to the management server 105.

Furthermore, if a generation of status information (error/alarm/jam, toner shortage caution, door open, etc.) is detected, the status information is transmitted to the management server 105. The information periodically transmitted according to the image-forming apparatus supervisory program 508 is not limited to the above-described information.

Figure 6:
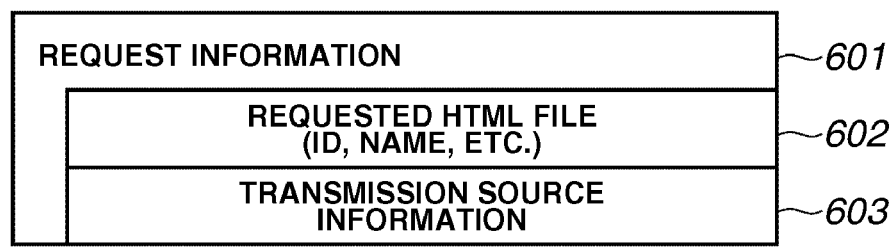
FIG. 6 illustrates example menu request data transmitted from an image-forming apparatus to the management server according to an embodiment of the present invention.

FIG. 6 illustrates example data transmitted from the image-forming apparatus 101 to the management server 105.

The example table illustrated in FIG. 6 includes only the data relating to this embodiment. According to an embodiment, the image-forming apparatus 101 and the management server 105 perform Hyper Text Transfer Protocol (HTTP)-based transmission/reception of menu request-related message(s). More specifically, request information 601 (the whole of transmission data) illustrated in FIG. 6 includes HTML file information 602 (ID or name of HTML file) identifying an HTML file requested to the management server 105 and transmission source information 603 (image-forming apparatus identifier or image-forming apparatus state information), which can identify the image-forming apparatus 101.

Figure 7:
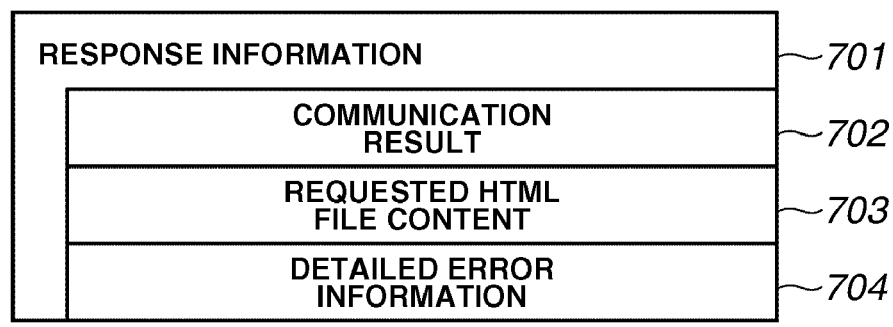
FIG. 7 illustrates example response data received from the management server that responds to a menu request according to an embodiment of the present invention.

FIG. 7 illustrate example response data received from the management server 105 responding to the transmission data (request information) 601. The example table illustrated in FIG. 7 includes only the data relating to this embodiment although the table can include any other control information not related to this embodiment.

More specifically, response information 701 illustrated in FIG. 7 is the whole of data received from the management server 105 responding to the transmission data (request information) 601. The response information 701 includes a communication result 702 (i.e., data indicating whether the menu request has been successfully received), HTML file content 703 (content of the requested HTML file), and error information 704 (details of error(s) having occurred in the reception of the menu request).

Figure 8:
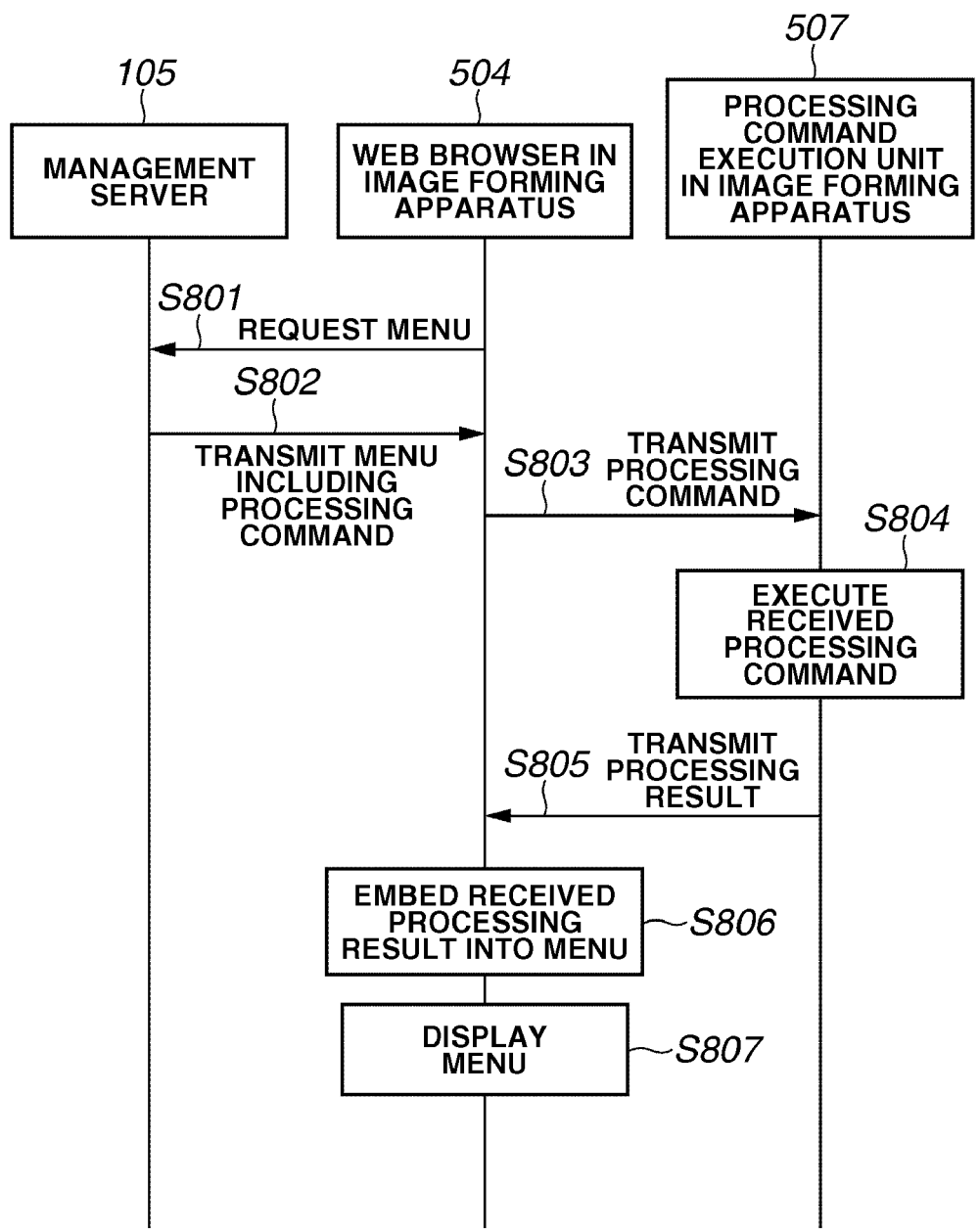
FIG. 8 is a sequence diagram illustrating example operations of a web browser and a processing command execution unit that operate on an image-forming apparatus in association with the management server according to an embodiment of the present invention.

FIG. 8 is a sequence diagram illustrating example operations of the web browser 504 and the processing command execution unit 507, which operate on the image-forming apparatus 101 (or 102) in association with the management server 105, according to an embodiment. The processing command execution unit 507 according to an embodiment can be realized by executing a program that acquires information of the image-forming apparatus.

In step S801, a user of the image-forming apparatus 101 transmits a menu request to the management server 105 via the web browser 504. In step S802, in response to the menu request having been received, the management server 105 transmits a menu 306 including a processing command to the web browser 504. In step S803, the web browser 504 transmits the processing command included in the received menu to the processing command execution unit 507. In step S804, the processing command execution unit 507 executes the received processing command. In step S805, the processing command execution unit 507 transmits a processing result to the web browser 504. In step S806, the web browser 504 generates a display file by embedding the processing result received in step S805 into the menu received in step S802. In step S807, the web browser 504 displays a menu corresponding to the display file.

Figure 9:
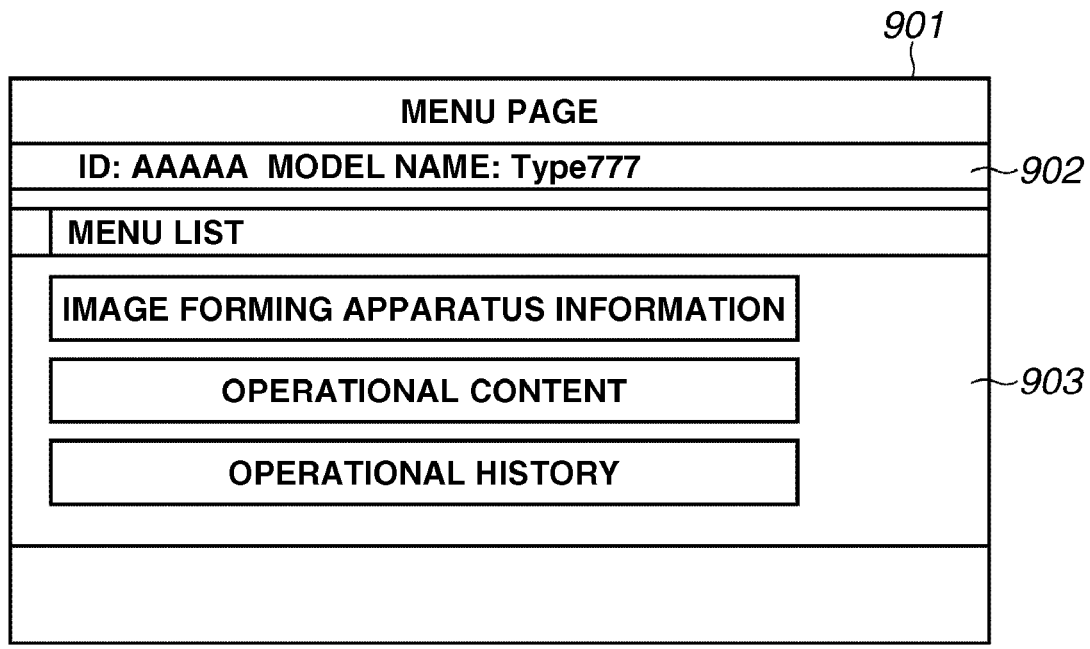
FIG. 9 illustrates an example display screen displayed when the web browser receives a menu from the management server according to a first embodiment of the present invention.

FIG. 9 illustrates an example display screen for the menu 306 stored in the web server 305 of the management server 105, which is received by the web browser 504 of the image-forming apparatus 101 and displayed on the operation unit 401. As illustrated in FIG. 9, a display screen according to an embodiment is a menu page screen 901 displayed on the operation unit 401. The menu page screen 901 includes an area 902 that displays embedded device information (ID and model name) of the image-forming apparatus 101 acquired from the processing command execution unit 507 in response to the processing command received from the management server, when the processing command is acquisition of image-forming apparatus device information (ID and model name) included in the menu 306. The menu page screen 901 includes operation buttons 903 that enable an operator to transmit the next menu request 601.

FIG. 10 illustrates an example HTML file 1001 that the web browser 504 receives from the management server 105 according to an embodiment. The example HTML file 1001 includes a description instructing display of the menu page 901 and a processing command 1002 requesting acquisition of image forming apparatus device information (ID and model name) from the processing command execution unit 507. According to an embodiment, the web browser 504 accesses the processing command execution unit 507 to acquire the image-forming apparatus device information (ID and model name) as an execution result of the received processing command, and transmits parameters of the acquired information.

The description area includes a processing result output from the processing command execution unit 507. An example processing result output from the processing command execution unit 507 is illustrated in FIG. 9. Furthermore, the parameters supplied from the web browser 504 to the processing command execution unit 507 are described below.

The HTML file 1001 includes an image-forming apparatus ID 1003 that is acquired by the processing command execution unit 507 and a description 1004 including an embedded model name.

FIG. 11 is an example table illustrating a relationship between information to be acquired and parameters transferred from the web browser 504 to the processing command execution unit 507. Both the management server 105 and the image-forming apparatus 101 store the same parameter table illustrated in FIG. 11. In this embodiment, the parameter table is stored in the ROM 203 (or the storage unit 208) and the ROM 404 (or the storage unit 406).

A field 1101 indicates a parameter "DeviceID" transferred to the processing command execution unit 507 when the web browser 504 acquires an ID from an image-forming apparatus. A field 1102 indicates a parameter "DeviceModel" transferred to the processing command execution unit 507 when the web browser 504 acquires a model name from an image-forming apparatus. A field 1103 indicates a parameter "Error" transferred to the processing command execution unit 507 when the web browser 504 acquires error information from an image-forming apparatus. A field 1104 indicates a parameter "PartsCount" transferred to the processing command execution unit 507 when the web browser 504 acquires degree-of-parts-consumption information from an image-forming apparatus.

FIG. 12 is an example processing result 1201 output from the processing command execution unit 507 according to an embodiment. As illustrated in FIG. 12, the processing command execution unit 507 receives parameters from the web browser 504 and acquires image-forming apparatus information corresponding to the received parameters, and outputs as a description instructing insertion of acquired values into variables.

Figure 13:
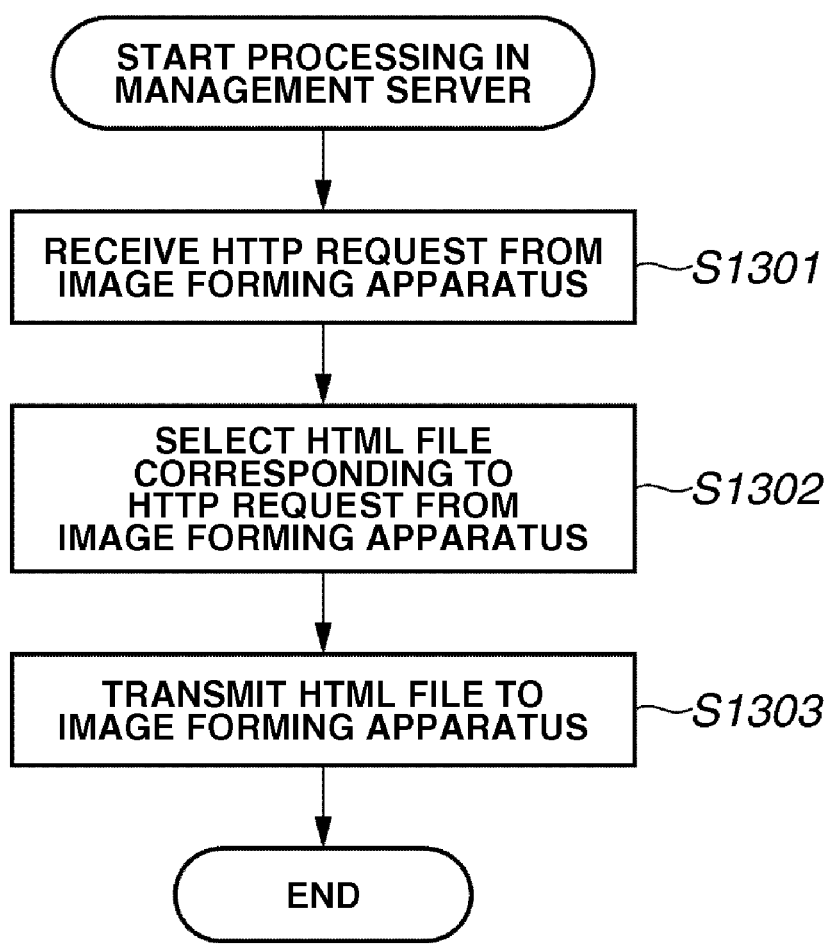
FIG. 13 is a flowchart illustrating an example operation performed by the management server when the management server receives a menu request from the web browser according to the first embodiment.

FIG. 13 is a flowchart illustrating an example operation performed by the management server 105 according to an embodiment. In step S1301, the management server 105 receives an HTTP request (requiring acquisition of the menu page 901) from the image-forming apparatus 101 (the web server 305) via the network I/F 205 and stores the received data into the RAM 204. In step S1302, the management server 105 acquires any data (ID or name of image-forming apparatus) identifying an HTML file from among the data stored in the RAM 204. Then, the management server 105 selects a corresponding HTML file from the menu 306 (HTML file) stored in the storage unit 208. In step S1303, the management server 105 adds the content of the HTML file selected in step S1002 to the field 703 of an HTTP response and the web server 305 transmits the HTTP response to the image-forming apparatus 101 via the network I/F 205.

Figure 14:
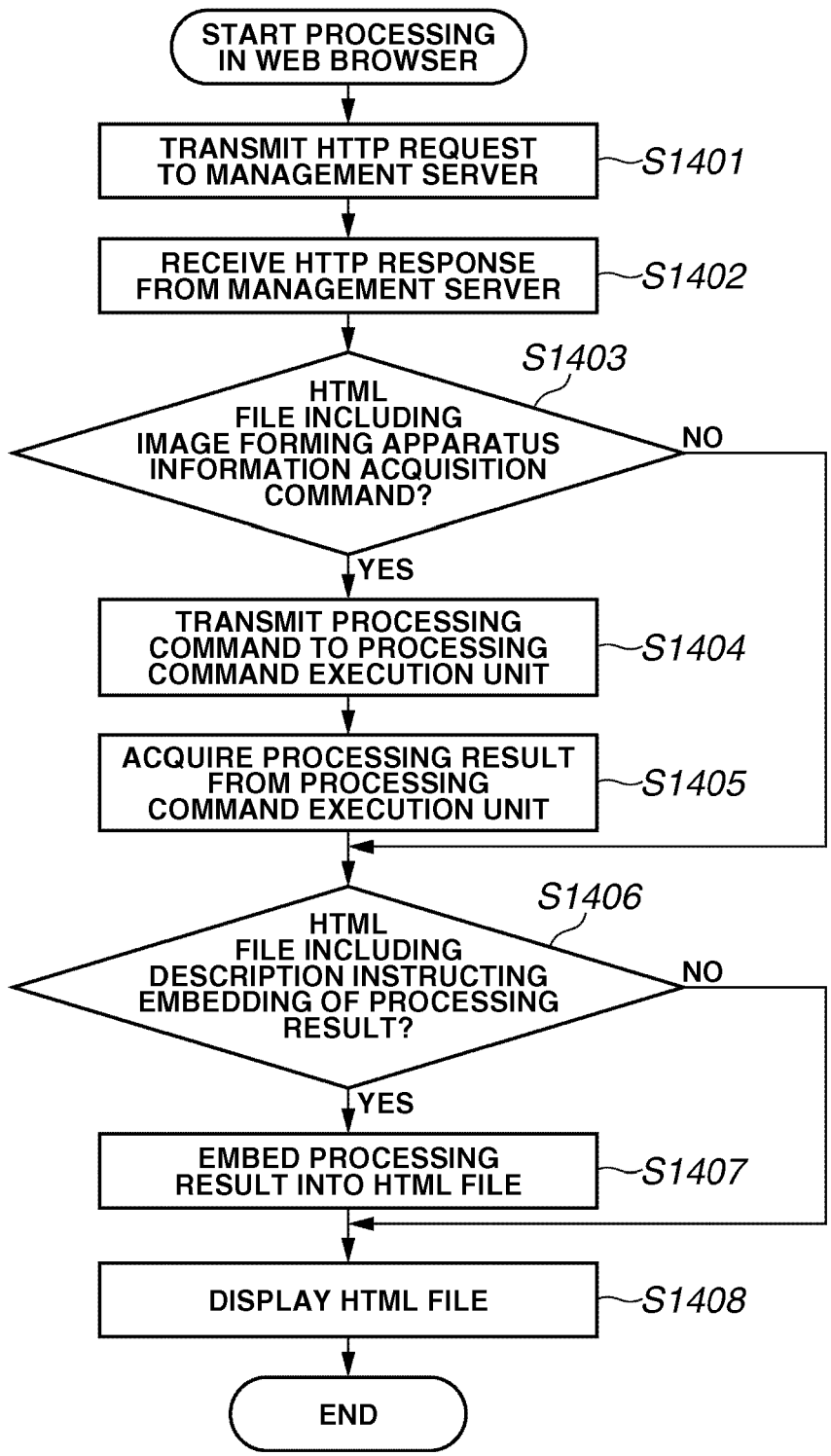
FIG. 14 is a flowchart illustrating an example operation performed by the web browser when the web browser transmits a menu request to the management server according to the first embodiment.

FIG. 14 is a flowchart illustrating an example operation performed by the web browser 504 according to an embodiment. In step S1401, the web browser 504 transmits an HTTP request of the menu page 901 to the management server 105 via the network I/F 402. In step S1402, the web browser 504 receives the HTTP response including the content of an HTML file relating to the display of the menu page 901, via the network I/F 402, from the management server 105 and stores the data into the RAM 405. In step S1403, the web browser 504 reads the HTML file content 703 from the data stored in the RAM 405. In this case, if the HTML file content 703 includes a processing command requesting acquisition of image-forming apparatus information (YES in step S1403), the processing proceeds to step S1404. If the processing command is not included (NO in step S1403), the processing proceeds to step S1406.

In this embodiment, the HTML file stored in the RAM 405 includes a processing command requesting acquisition of an ID and a model name of the image-forming apparatus 101. Therefore, the processing proceeds to step S1404. In step S1404, the web browser 504 transmits a processing command requesting acquisition of device information (ID and model name) of the image-forming apparatus 101 to the processing command execution unit 507 via the web server 506. In step S1405, the web browser 504 receives via the web server 506 an acquisition result from the processing command execution unit 507. The acquisition result includes the device information (ID and model name) of the image-forming apparatus 101. The web browser 504 stores the received acquisition result into the RAM 405.

In step S1406, the web browser 504 determines whether the HTML file stored in the RAM 405 includes any description instructing embedding of image-forming apparatus information. If the HTML file includes a description instructing the embedding of image-forming apparatus information (YES in step S1406), the processing proceeds to step S1407. If the HTML file does not include any description instructing the embedding of image-forming apparatus information (NO in step S1406), the processing proceeds to step S1408.

In this embodiment, the HTML file includes a description instructing the display of the menu page 901 including the device information (ID and model name) of the image-forming apparatus 101 stored in the RAM 405. Therefore, the processing proceeds to step S1407. In step S1407, the web browser 504 embeds the device information (ID and model name) of the image-forming apparatus 101 stored in the RAM 405 into designated portions of the HTML file stored in the RAM 405. In step S1408, the web browser 504 causes the operation unit 401 to display a resultant HTML file.

Figure 15:
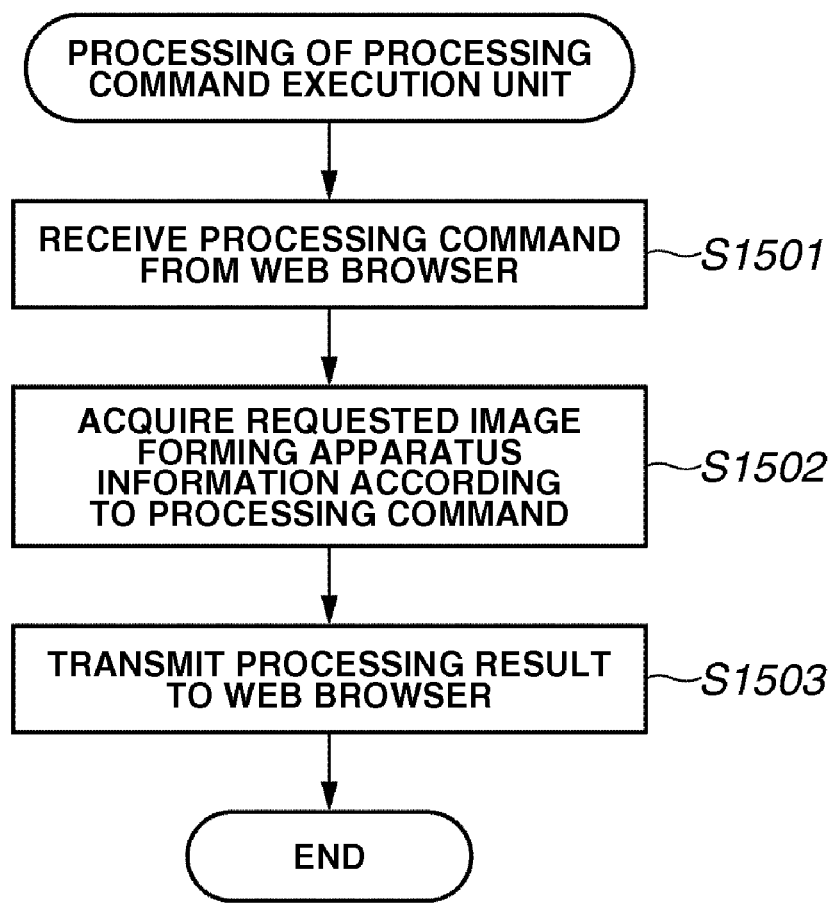
FIG. 15 is a flowchart illustrating example processing performed by an image-forming apparatus that executes the information acquisition program to receive a processing command from the web browser according to the first embodiment.

FIG. 15 is a flowchart illustrating example processing performed by the processing command execution unit 507 according to an embodiment. In step S1501, the processing command execution unit 507 receives, via the web server 506, a processing command from the web browser 504, which requests acquisition of image-forming apparatus device information (ID and model name). The processing command execution unit 507 stores the received processing command into the RAM 405.

In step S1502, the processing command execution unit 507 acquires the image-forming apparatus information (ID and model name of the image-forming apparatus) requested by the processing command stored in the RAM 405 from the storage unit 406 via the controller 502, and stores the acquired image-forming apparatus information into the RAM 405. In step S1503, the processing command execution unit 507 transmits, via the web server 506, the image forming apparatus device information (ID and model name), which is stored in the RAM 405, to the web browser 504.

In this embodiment, the image-forming apparatus information stored in the image-forming apparatus 101 includes basic information, such as ID of image-forming apparatus, firmware type of image-forming apparatus, and model type of image-forming apparatus. In addition, the image-forming apparatus information includes error/alarm/jam information as well as degree-of-parts-consumption information. However, the image-forming apparatus information is not limited to the above-described information and can include various types of information. Furthermore, an example screen displayed by the operation unit 401 is not limited to the acquisition of image-forming apparatus device information (ID and model name).

Second Embodiment

An example operation according to a second embodiment includes transmitting the information of the image-forming apparatus 101 acquired by the processing command execution unit 507 to the management server 105 when a user presses a button.

Figure 16:
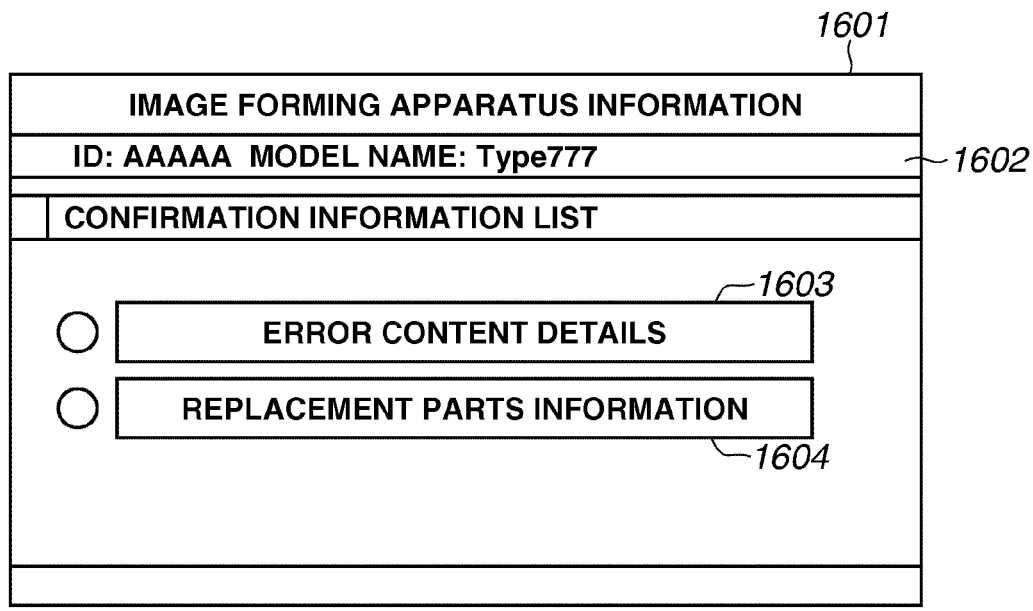
FIG. 16 illustrates an example display screen displayed when the web browser receives a menu from the management server according to a second embodiment of the present invention.

FIG. 16 illustrates an example display screen displayed by the operation unit 401, when the web browser 504 of the image-forming apparatus 101 receives an HTML file from the web server 305 of the management server 105. An image-forming apparatus information screen 1601 is an example display screen displayed by the operation unit 401.

An area 1602 displays embedded image-forming apparatus device information (ID and model name) acquired from the processing command execution unit 507 in response to a processing command requesting the acquisition of image-forming apparatus device information (ID and model name) included in the menu 306, error information of image-forming apparatus, and degree-of-parts-consumption information. The data is stored in the RAM 405. The error information and the degree-of-parts-consumption information are not displayed on the display screen 1601 and stored in the RAM 405. The display screen 1601 includes operation buttons 1603 and 1604 that enable an operator who wants to acquire the next menu 306 to transmit a menu request to the management server 105.

If a user presses the button 1603, transmission source information 603 containing error information and the information (ID, model name) of the image-forming apparatus 101 stored in the RAM 405 is added to the menu request and transmitted to the management server 105. If a user presses the button 1604, transmission source information 603 containing degree-of-parts-consumption information and the information (ID, model name) of the image-forming apparatus 101 stored in the RAM 405 is added to the menu request and transmitted to the management server 105.

FIG. 17 illustrates an example display screen 1701 displayed by the operation unit 401 when a user presses the button 1603 on the display screen 1601. The screen 1701 displays details of error content. In this embodiment, when the web browser 504 receives the menu 306 from the management server 105, the menu 306 does not include any processing command. The management server 105 generates the menu 306 for displaying the detailed error content screen 1701 based on the information of the image-forming apparatus 101 received from the web browser 504. The display screen 1701 includes an area 1702 displaying the device information (ID and model name) of the image-forming apparatus 101, an area 1703 displaying error information, and an area 1704 displaying cause and resolution corresponding to the error information stored by the management server 105.

In this embodiment, the menu 306, that the web browser 504 receives from the management server 105, includes a processing command requesting the acquisition of information (ID, model name) of the image-forming apparatus 101 together with error information and degree-of-parts-consumption information. Furthermore, the received menu 306 displays the acquired information (ID, model name) of the image-forming apparatus 101 on the menu page 901 and does not display any error information or degree-of-parts-consumption information.

FIG. 18 illustrates an example HTML file received by the web browser 504 from the management server 105 according to an embodiment. An HTML file 1801 includes a description instructing display of the image-forming apparatus information page 1601. The HTML file 1801 includes a description 1802 of a processing command that requests the acquisition of device information (ID and model name), error information, and degree-of-parts-consumption information from the processing command execution unit 507. The web browser 504 accesses the processing command execution unit 507 and transfers the parameters of device information (ID and model name), error information, and degree-of-parts-consumption information to the processing command execution unit 507. A processing result transmitted from the processing command execution unit 507 is inserted into this description area.

FIG. 19 illustrates an example processing result output from the processing command execution unit 507. The acquired information is not managed by the management server 105 and includes the latest counter information and the current status of an image-forming apparatus. The HTML file 1801 includes a description 1803 instructing, if a user presses the button 1603, inserting each information value (processing result obtained by the processing command execution unit 507) into data to be transmitted to the management server 105. The HTML file 1801 includes a description 1804 of ID and a description 1805 of model name, which are acquired by the processing command execution unit 507 as information to be embedded into the page display.

The HTML file 1801 includes a description 1806 relating to display of the button 1603 and a description 1807 relating to transmission of the ID of image-forming apparatus 101 to the management server 105 if a user presses the button 1603. Furthermore, the HTML file 1801 includes a description 1808 relating to transmission of the model name of the image-forming apparatus 101 to the management server 105 if a user presses the button 1603 and a description 1809 relating to transmission of error information of the image-forming apparatus 101 to the management server 105 if a user presses the button 1603.

FIG. 19 illustrates an example processing result output from the processing command execution unit 507, which has processed a processing command acquired from the web browser 504, according to an embodiment. An example output 1901 includes a description indicating device information (ID and model name), error information, and degree-of-parts-consumption information of an image-forming apparatus acquired by the processing command execution unit 507 and inserted into variables.

Figure 20:
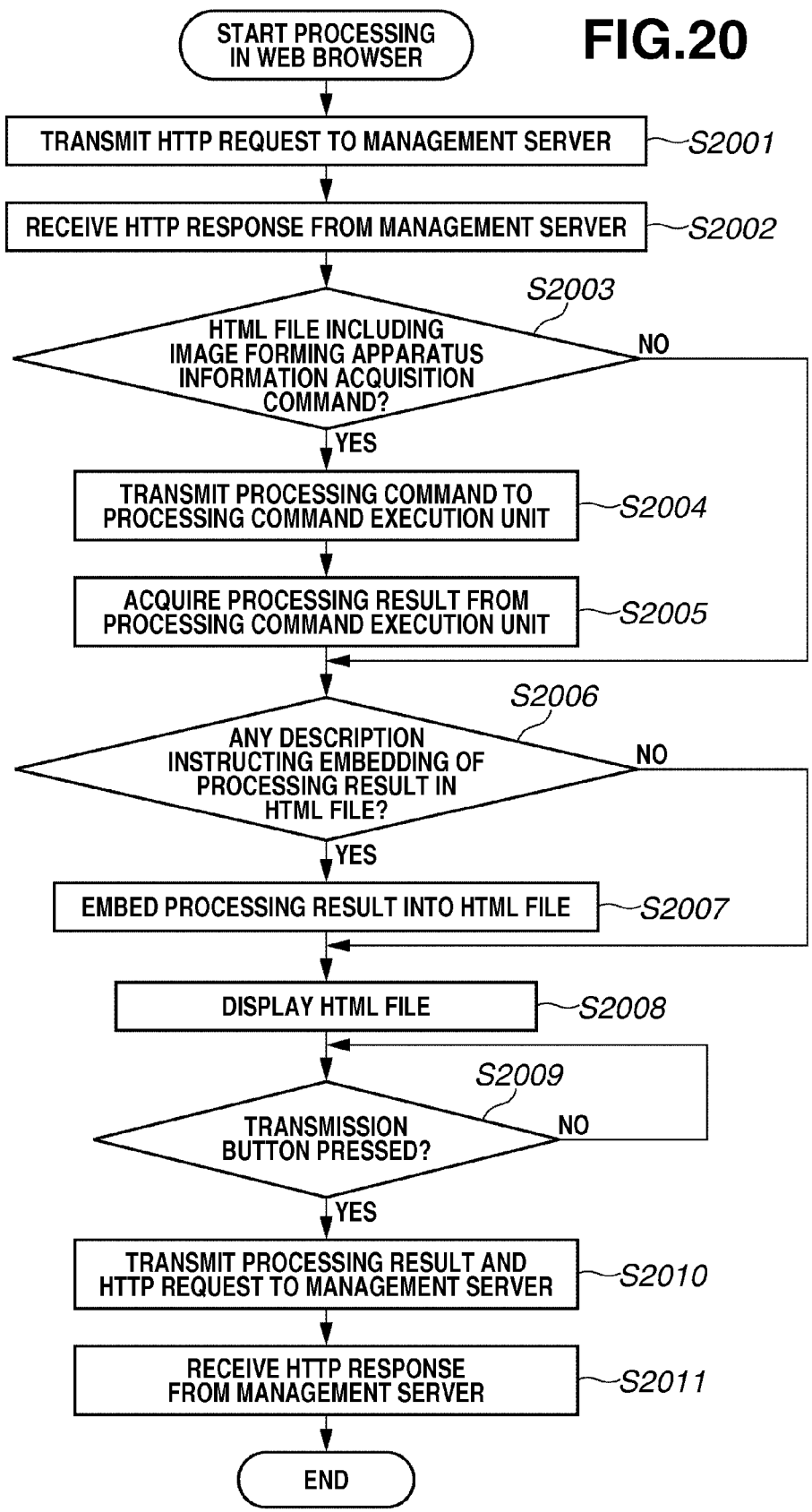
FIG. 20 is a flowchart illustrating an example operation performed by the web browser, which receives a menu from the management server and transmits acquired image-forming apparatus information to the management server, according to the second embodiment.

FIG. 20 is a flowchart illustrating an example operation performed by the web browser 504 according to an embodiment.

In step S2001, the web browser 504 transmits an HTTP request for the image-forming apparatus information screen 1601 to the management server 105 via the network I/F 402. In step S2002, the web browser 504 receives an HTTP response including the content of an HTML file relating to the display of the image-forming apparatus information screen 1601 from the management server 105 via the network I/F 402. The web browser 504 stores the received data into the RAM 405.

In step S2003, the web browser 504 acquires and reads the HTML file content 703 from the data stored in the RAM 405. If the HTML file content 703 includes a processing command requesting the acquisition of image-forming apparatus information (YES in step S2003), the processing proceeds to step S2004. If the HTML file content 703 does not include any processing command requesting the acquisition of image-forming apparatus information (NO in step S2003), the processing proceeds to step S2006. In this embodiment, the HTML file content 703 that the web browser 504 has stored in the RAM 405 includes a processing command requesting the acquisition of device information (ID and model name) of the image-forming apparatus 101, error information, and degree-of-parts-consumption information. Thus, the processing proceeds to step S2004.

In step S2004, the web browser 504 transmits the processing command stored in the storage unit 406, which requests the acquisition of device information (ID, model name) of the image-forming apparatus 101, error information, and degree-of-parts-consumption information, to the processing command execution unit 507 via the web server 506.

In step S2005, the web browser 504 receives a processing result including device information (ID, model name) of the image-forming apparatus 101, error information, and degree-of-parts-consumption information from the processing command execution unit 507 via the web server 506. The web browser 504 stores the received processing result into the RAM 405.

In step S2006, the web browser 504 determines whether the HTML file stored in the RAM 405 includes any description instructing embedding of image-forming apparatus information. If the HTML file includes a description instructing the embedding of image-forming apparatus information (YES in step S2006), the processing proceeds to step S2007. If the HTML file does not include any description instructing the embedding of image-forming apparatus information (NO in step S2006), the processing proceeds to step S2008.

According to this embodiment, the HTML file that the web browser 504 has stored in the RAM 405 includes a description instructing the display of device information (ID and model name) of the image-forming apparatus 101 on the image-forming apparatus information screen 1601. Therefore, the processing proceeds to step S2007. In step S2007, the web browser 504 embeds the device information (ID and model name) of the image-forming apparatus 101 stored in the RAM 405 into a designated area of the HTML file stored in the RAM 405. In step S2008, the web browser 504 causes the operation unit 401 to display the HTML file. In step S2009, the web browser 504 determines whether a user presses a button on the operation unit 401. If the button is pressed (YES in step S2009), the processing proceeds to step S2010.

In step S2010, the web browser 504 transmits an HTTP request for the detailed error content screen 1701 to the management server 105 via the network I/F 402. In this case, the web browser 504 adds the transmission source information 603, which includes device information (ID, model name) of the image-forming apparatus 101 and error information stored in the RAM 405, to the HTTP request for the detailed error content screen 1701 to be transmitted.

In step S2011, the web browser 504 receives an HTTP response including the menu 406, which displays the detailed error content screen 1701, from the management server 105 via the network I/F 402. The web browser 504 stores the received data into the RAM 405. The operation unit 401 displays the screen 1701 based on the HTML file that the web browser 504 has stored in the RAM 405.

Third Embodiment

An example operation according to a third embodiment of the present invention includes adding transmission source information 603 including image-forming apparatus information stored in the image-forming apparatus 101 to an HTTP request when the HTTP response is transmitted to the web browser 504 (step S1401 or S2001).

FIG. 21 illustrates an example display screen displayed by the operation unit 401 when the ID stored in the storage unit 406 (identification information of the image-forming apparatus 101) is included in the transmission source information 603 of the HTTP request, which is transmitted to the management server 105.

In this embodiment, the menu 306 that the web browser 504 receives from the management server 105 is an HTML file instructing display of error/alarm history information of the image-forming apparatus 101 stored in the storage unit 208 of the management server 105. Based on the ID of the image-forming apparatus 101 transmitted from the web browser 504, the management server 105 authenticates the image-forming apparatus 101 and generates the menu 306.

The operation unit 401 can display a display screen 2101 for jam/alarm history information relating to the image-forming apparatus 101. The display screen 2101 includes an area 2102 in which information (ID, model name) of the image-forming apparatus 101 is displayed and an area 2103 in which error/alarm information relating to the image-forming apparatus 101 (which is stored in the management server 105) is displayed.

Figure 22:
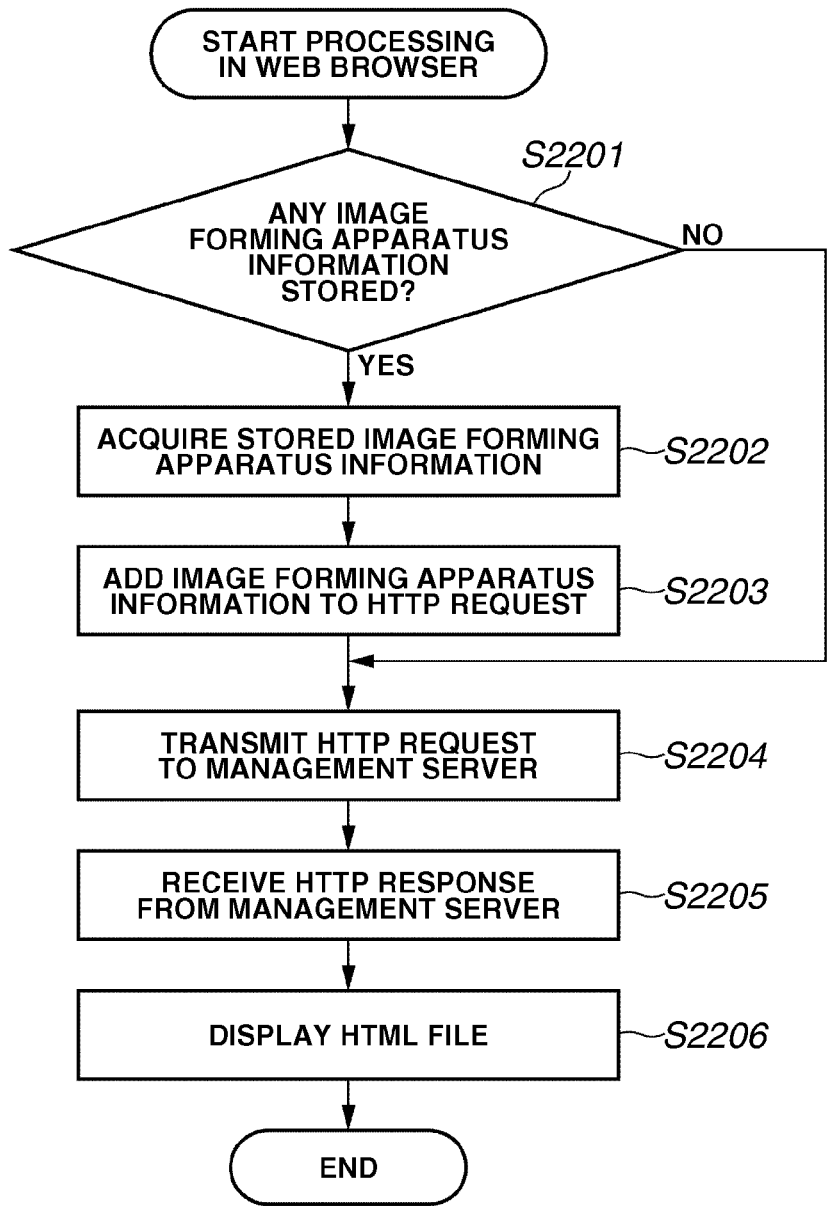
FIG. 22 is a flowchart illustrating an example operation performed by the web browser, which transmits stored image-forming apparatus information to the management server, according to the third embodiment.

FIG. 22 is a flowchart illustrating an example operation performed by the web browser 504 according to an embodiment. The image-forming apparatus information, which is acquired when the image-forming apparatus 101 starts its operation, is stored in the storage unit 406.

In step S2201, the web browser 504 determines whether the image-forming apparatus information is stored in the storage unit 406. If the image-forming apparatus information is stored (YES in step S2201), the processing proceeds to step S2202. If the image-forming apparatus information is not stored (NO in step S2201), the processing proceeds to step S2204.

In this case, the ID of the image-forming apparatus 101 is stored. In step S2202, the web browser 504 acquires the ID of the image-forming apparatus 101 from the storage unit 406 and stores the acquired ID information into the RAM 405. In step S2203, the web browser 504 adds the transmission source information 603 including the ID of the image-forming apparatus 101 stored in the RAM 405 to an HTTP request and stores the content of the HTTP request into the RAM 405.

In step S2204, the web browser 504 transmits the HTTP request stored in the RAM 405 to the management server 105 via the network I/F 402. In step S2205, the web browser 504 receives an HTTP response from the management server 105 via the network I/F 402 and stores the received data into the RAM 405. In step S2206, the web browser 504 causes the operation unit 401 to display the content of the HTML file.

Figure 23:
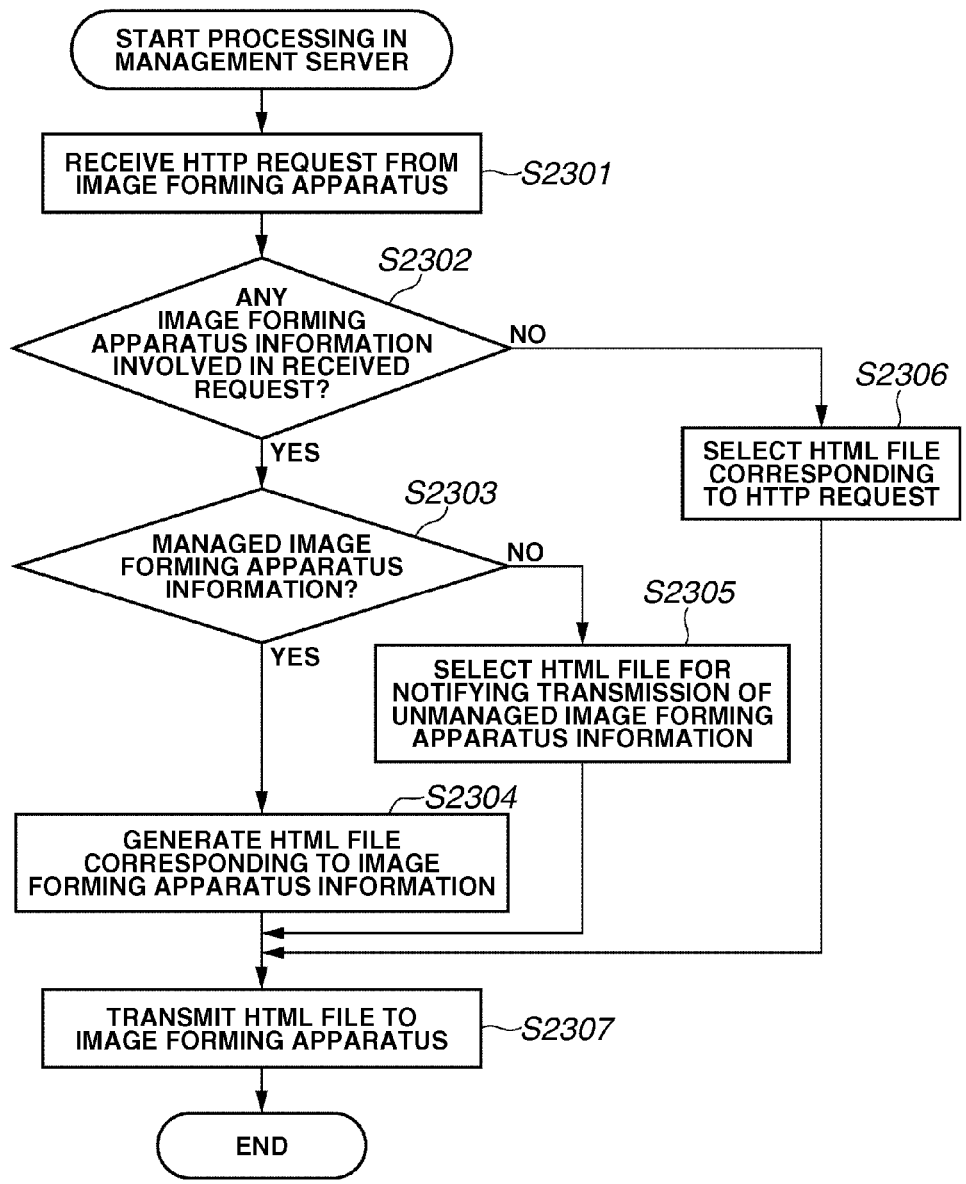
FIG. 23 is a flowchart illustrating an example operation performed by the management server, which receives a menu request from the web browser, according to the third embodiment.

FIG. 23 is a flowchart illustrating an example operation performed by the management server 105 according to an embodiment. In step S2301, the web server 305 of the management server 105 receives an HTTP request for the jam/alarm history page 2101 from an image-forming apparatus via the network I/F 205. The management server 105 stores the received data into the RAM 204.

In step S2302, the management server 105 determines whether the data stored in the RAM 204 includes image-forming apparatus information. If the image-forming apparatus information is included (YES in step S2302), the processing proceeds to step S2303. If the image-forming apparatus information is not included (NO in step S2302), the processing proceeds to step S2306. In this embodiment, the ID of the image-forming apparatus 101 is included in the data that the management server 105 has stored in the RAM 204.

In step S2303, the management server 105 acquires the ID of the image-forming apparatus 101 stored in the RAM 204 and determines whether a corresponding image-forming apparatus is present in an image-forming apparatus management table (not illustrated) stored in the storage unit 208. If the corresponding image-forming apparatus is present (YES in step S2303), the processing proceeds to step S2304. If the corresponding image-forming apparatus is not present (NO in step S2303), the processing proceeds to step S2305. In this embodiment, the image-forming apparatus 101 is present in the image-forming apparatus management table stored in the storage unit 208.

In step S2304, the management server 105 acquires the data (ID, name, etc.) identifying an HTML file from the data stored in the RAM 204 and selects a corresponding HTML file from the menu 306 (HTML file) stored in the storage unit 208. Furthermore, the management server 105 acquires jam/alarm history information relating to the image-forming apparatus 101 from the storage unit 208 and embeds the acquired jam/alarm history information into the HTML file.

In step S2307, the management server 105 adds the content of the HTML file generated in step S2304 as the HTML file content 703 to be included in an HTTP response. The management server 105 transmits the HTTP response to the image-forming apparatus 101 via the web server 305. In step S2305, the management server 105 selects, from the menu 306 stored in the storage unit 208, an HTML file notifying that unmanaged image-forming apparatus information has been acquired.

In this embodiment, the management server 105 authenticates the image-forming apparatus 101 based on the ID of the image-forming apparatus 101 received from the image-forming apparatus 101. Then, the management server 105 embeds the stored unique information of the image-forming apparatus 101 (error/alarm history information of the image-forming apparatus 101) into the menu 306 and generates an HTML file.

According to an embodiment, the image-forming apparatus 101 holds the ID of the image-forming apparatus 101 and transmits the ID to the management server 105. Therefore, the management server 105 generates an HTML file differentiated for each image-forming apparatus. However, the information held by the image-forming apparatus 101 is not limited to ID. For example, the image-forming apparatus 101 holds error information of the image-forming apparatus 101 and the management server 105 can generate an HTML file differentiated according to the presence of error.

FIGS. 24 through 32 illustrate a series of operation screens for a service engineer who works for on maintenance of an image-forming apparatus according to an embodiment.

Figure 24:
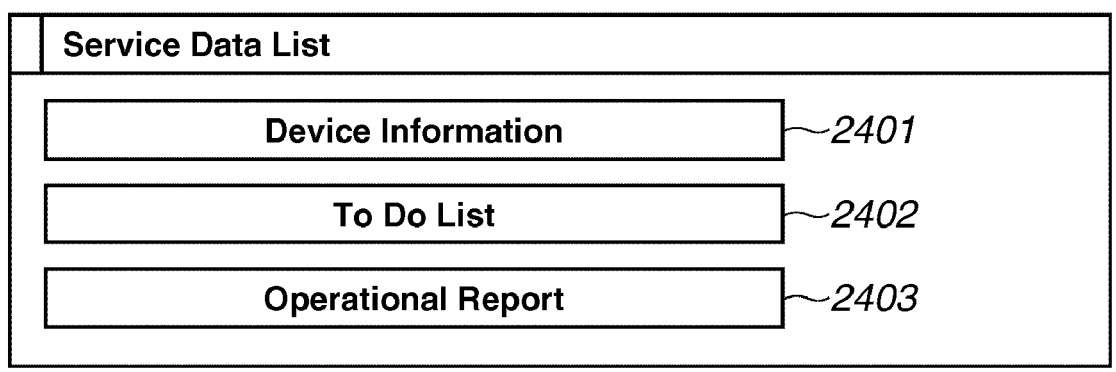
FIG. 24 illustrates an example top page screen that enables a service engineer to select an item from a plurality of menu buttons for a maintenance operation according to an embodiment of the present invention.

FIG. 24 illustrates a top page screen that enables a user to select an item from among a plurality of menu buttons. If a user presses a button 2401, an image-forming apparatus information screen is displayed. If a user presses a button 2402, a maintenance operation information screen is displayed. If a user presses a button 2403, an operational report creation screen is displayed.

Figure 31:
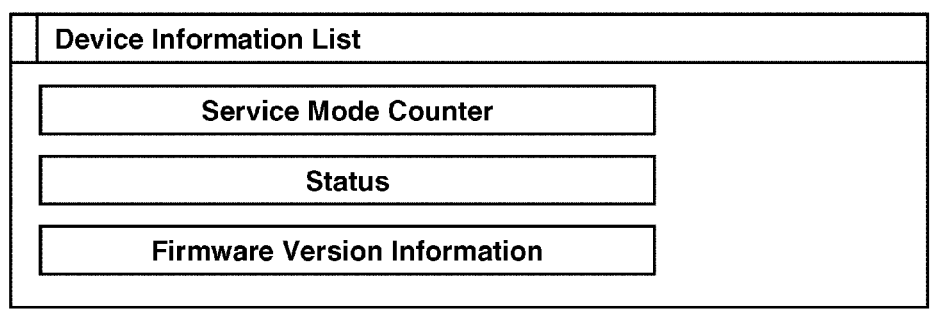
FIG. 31 illustrates an example menu screen that enables a user to refer to device information according to an embodiment of the present invention.

FIG. 31 illustrates an example image-forming apparatus information screen entitled "Device Information List" displayed when a user presses the buttons 2401. FIG. 25 illustrates an example maintenance operation information screen entitled "To Do List" displayed when a user presses the buttons 2402. FIG. 30 illustrates an example operational report creation screen entitled "Create Engineer Operational Report" displayed when a user presses the buttons 2403.

The menu screen illustrated in FIG. 25, displayed when a user presses the button 2402 illustrated in FIG. 24, includes buttons 2404, 2405, and 2406. If a user presses the button 2404, a detailed failure information screen is displayed. If a user presses the button 2405, a detailed part replacement information screen is displayed. If a user presses the button 2406, an operational history screen is displayed.

FIG. 26 illustrates an example detailed failure information screen entitled "Service Call Details" displayed when a user presses the button 2404. FIG. 32 illustrates an example detailed part replacement information screen entitled "Display Replacement Parts Details" displayed when a user presses the button 2405. FIG. 29 illustrates an example operational history screen entitled "Operational history" displayed when a user presses the button 2406.

The example screen illustrated in FIG. 26 includes, from left to right, the fields of "Code", "Details", and "Analysis Results." According to this embodiment, the error code identifying a failure is E540 (8001) and the failure content is "The rise and fall error of the tray." FIG. 27 illustrates an example screen including failure analysis result(s) and resolution method(s), displayed when a user presses a button 2407. The maintenance operation menu screen illustrated in FIG. 25 is displayed when a user presses a button 2408.

The example screen illustrated in FIG. 27 displays candidate parts to be replaced to resolve the failure as well as a relationship between failure cause(s) and resolution method(s). More specifically, the screen display content includes two tables. A table 2417 indicates information relating to replacement parts, and a table 2418 indicates failure cause(s) and resolution method(s).

More specifically, the table 2417 includes, from left to right, the fields of "Part Code", "Part Counter Value", "Degree of part Consumption", and "Replacement Steps." The "Part Code" is an identification code number of each part. The "Part Counter Value" is a counter for parts that counts the number of used parts. The "Degree of part Consumption" is a usage stage of the part in comparison with the entire lifetime of the part.

The table 2418 includes supplementary information describing that the Service Manuals include seven methods relating to the error, from which two methods are selected according to the operational history. The table 2418 includes, from left to right, the fields of "Cause" and "Resolution." In this example, the failure cause is "The standard tray has been operated, however, the surface of copy paper was unable to be detected." There are two resolution methods listed. One method is "Check the home position sensor connector of the standard tray", and the other method is "Replace the home position sensor of the standard tray with a new one."

Figure 28:
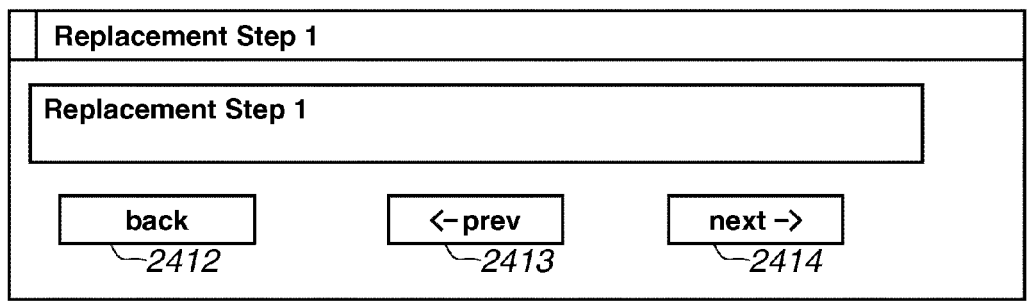
FIG. 28 illustrates an example screen that displays a part replacement procedure according to an embodiment of the present invention.

If a user presses a button 2409 or a button 2410, a part replacement procedure screen entitled "Replacement Step 1" illustrated in FIG. 28 is displayed. If a user presses a button 2411, the detailed failure information display screen entitled "Service Call Details" illustrated in FIG. 26 is displayed.

The example screen illustrated in FIG. 28 can include a character string indicating a procedure for replacement or a guidance using illustration(s). If a user presses a button 2412, the screen including failure analysis result(s) and resolution method(s) illustrated in FIG. 27 is displayed. If a user presses a button 2414, the next procedure (if present) is displayed. If a user presses a button 2413, the screen illustrated in FIG. 27 is displayed when the current page is the initial screen for the part replacement procedure and, otherwise, the previous procedure screen is displayed.

The example operational history screen illustrated in FIG. 29, which is displayed when a user presses the button 2406 illustrated in FIG. 25, includes the fields of "Date", "Engineering Operation", "Engineer Name", and "Counter Value" arrayed from left to right. According to this embodiment, the "Engineering Operation" is K-ROLL replacement or CLR-UNIT replacement. The "Engineer Name" is Aaaa. If a user presses a button 2415, the maintenance operation menu screen illustrated in FIG. 25 is displayed.

The operational report creation screen illustrated in FIG. 30, which is displayed when a user presses the buttons 2403 illustrated in FIG. 24, enables a user (service engineer) to designate the reason for operation, operational content (replacement parts), and other items. More specifically, the example screen illustrated in FIG. 30 includes an area 2419 indicating start date/time and finish date/time. An area 2420 enables a user to select a reason for operation among "Periodical Visit", "Repair", "Consumable Delivery", and "Other." An area 2421 enables a user to select an operational content from among "Poor Image Quality", "Jam", "Error", "Part replacement", "Mechanical Noise", and "Other." Detailed reasons can be input only when the option "Other" is selected.

An area 2422 is displayed if any failure occurs in an image-forming apparatus. A user can select either "Handled" or "Not Handled." An area 2423 enables a user to select a type of replacement parts from among "Drum", "Optical Area", "Cleaner", "Transport Area", "Developing Area", "Fixing/Delivery Area", "Pick up Area", and "Charging Wire." An area 2424 enables a user to select a part replacement reason from among "Recommended Lifetime", "Scratch", "Broken", and "Other". Detailed reasons can be input only when the option "Other" is selected.

If a user presses a button 2415 on the screen illustrated in FIG. 30, the input content is transmitted to the management server 105. Then, an operational report created by the management server 105 is displayed. Details of the operational report creation will be described below. If a user presses a button 2416, the menu selection top page illustrated in FIG. 24 is displayed.

The image-forming apparatus information screen illustrated in FIG. 31, which is displayed when a user presses the buttons 2401 illustrated in FIG. 24, includes selection items, which enable a user to confirm "Service Model Counter" (number of printed sheets), "Status" (paper jam, door open, etc.), and "Firmware Version Information" of the image-forming apparatus.

The detailed part replacement information screen illustrated in FIG. 32 is displayed when a user presses the button 2405 illustrated in FIG. 25.

Figure 33:
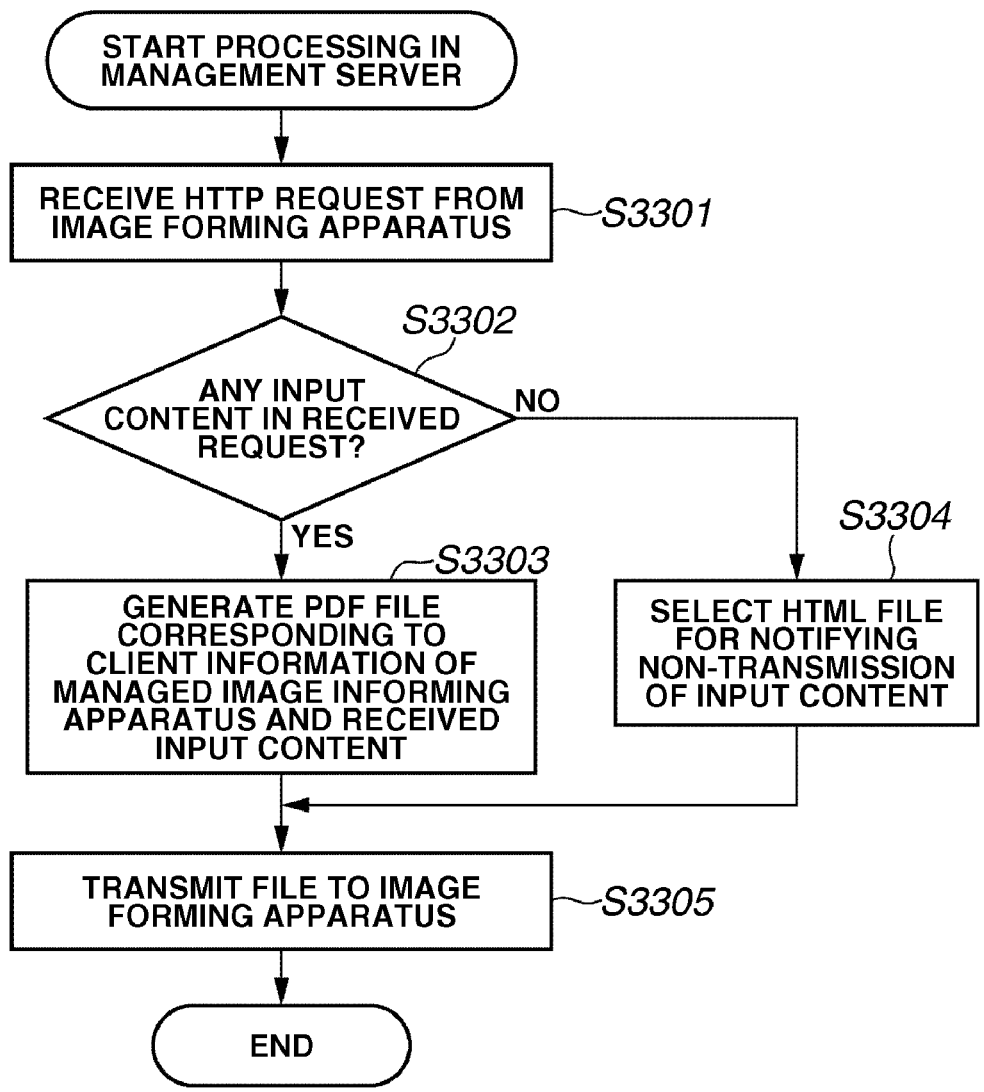
FIG. 33 is a flowchart illustrating an operation performed by the management server, which performs an operational report creation, according to an embodiment of the present invention.

FIG. 33 is a flowchart illustrating an example operation performed by the management server 105 when the button 2415 is pressed on the screen illustrated in FIG. 30 for creation of an operational report.

In step S3301, the management server 105 receives an HTTP request that includes input content transmitted from the image-forming apparatus 101 via the network I/F 205. The management server 105 stores the received data into the RAM 204. In step S3302, the management server 105 acquires the input content from the data stored in the RAM 204. If the input content is included (YES in step S3302), the processing proceeds to step S3303. If the input content is not included (NO in step S3302), the processing proceeds to step S3304. In this example, the button 2415 has been selected after completing input via the operational report creation screen illustrated in FIG. 30. Therefore, the processing proceeds to step S3303.

In step S3303, the management server 105 acquires management information (client information, etc.) relating to the image-forming apparatus 101 from the image-forming apparatus management table (not illustrated) stored in the storage unit 208. The management server 105 generates a Portable Document Format (PDF) file of an operational report based on the acquired client information and the input content acquired from the RAM 204. In step S3305, the management server 105 adds the operational report generated in step S3303 to the field 703 of an HTTP response and transmits the HTTP response to the image-forming apparatus 101 via the network I/F 205. In step S3304, the management server 105 selects an HTML file that notifies non-transmission of the input content. Then, in step S3305, the management server 105 transmits the HTML file to the image-forming apparatus 101.

Figure 34:
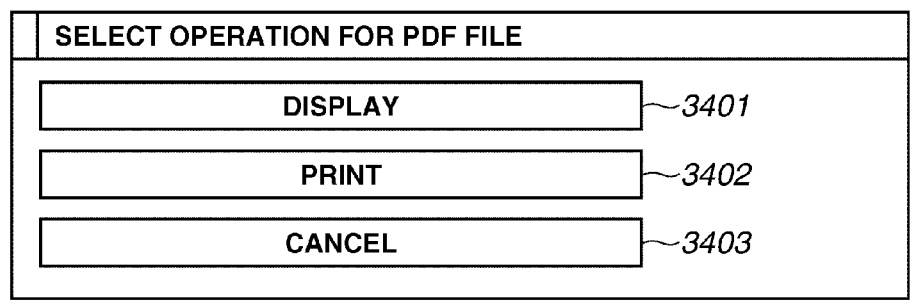
FIG. 34 illustrates an example operation selection screen that enables a user to select an operation for an operational report generated by the management server according to an embodiment of the present invention.

FIG. 34 illustrates an example operation selection screen that enables a user to select an operation for an operational report generated by the management server 105. The operation selection screen enables a user to select one of menu buttons, i.e., a button 3401 instructing the web browser 504 to display an operational report, a button 3402 instructing the image-forming apparatus 101 to print an operational report, and a button 3403 allowing a user to cancel an already-instructed operation. If a user presses the button 3401, the operational report is displayed. If a user presses the button 3402, the operational report is printed. If a user presses the button 3403, the operational report creation screen illustrated in FIG. 30 is displayed again.

FIG. 35 illustrates an example operational report displayed by the web browser 504 when a user presses the button 3401 on the screen illustrated in FIG. 34.

The operational report includes a table 3501 indicating operation date and engineer's information, a table 3502 indicating client information of the image-forming apparatus 101, and a table 3503 indicating detailed information relating to the image-forming apparatus 101. The table 3501 includes the fields of "Operation Date", "Start Time", "Finish Time", "Reason for Operation", "Engineer's ID", and "Engineer's Name." The table 3502 includes the fields of "Sales Division (administrator) ID", "Sales Division (administrator) Name", "device ID", "Model Name", "Setup Data", "Client ID", "Client Name", and "Client Address" relating to the image-forming apparatus 101. The table 3503 includes the tables of "Error", "Counter", "Firmware Version", and "Operational Content" relating to the image-forming apparatus 101.

The error information "Error" includes the fields of "Error Resolvable by Client", "Error Requiring Resolution by Engineer", "Alarm", and "Jam", which respectively display the number of error occurrences. The counter information "Counter" includes the fields of "Total", "Monochrome", "Overlay", "Two-sided", and "Document Feeder", which respectively display the number of printed sheets for each of the large size and the small size.

The firmware version information "Firmware Version" includes the fields of "Type", "Name", and "Version" which respectively display information of each firmware. The operational content information "Operational Content" includes the fields of "Phenomenon", "Details", "Action", "Note", and "Resolution State", which respectively display operational content classification (error, parts replacement, etc.), detailed contents, action content, note, and resolution state (finished, unfinished). Furthermore, an area 3504 displays an appearance of the image-forming apparatus 101.

An embodiment can receive information from the management server 105 via the web browser 504 operating on the image-forming apparatus and can provide a service engineer at a maintenance work with information that reflects the latest counter information stored in the image-forming apparatus. Furthermore, an embodiment enables a service engineer to create an operational report by summarizing maintenance results via the web browser 504 operating on the image-forming apparatus. Thus, a service engineer is not required to prepare beforehand any manual and/or report sheet applied to a failure having occurred.

In addition, the system configuration according to an embodiment is useful when any failure newly occurs at the location where a service engineer is dispatched. According to a conventional system, a service engineer at a client's office or facility cannot obtain any manual or report sheet(s) necessary for the newly found failure. Therefore, the service engineer returns and comes again with necessary things.

However, according to an embodiment of the present invention, a service engineer can confirm a newly found failure at an image-forming apparatus located at a remote place and can appropriately perform a maintenance operation while viewing a method displayed on a monitor of the image-forming apparatus. Furthermore, an embodiment of the present invention can acquire history information and other information managed by a management server. The web browser according to an embodiment of the present invention enables a user to input maintenance results and properly follow an instruction received in response to the maintenance results.

In this embodiment, if any additional repair work is required for an image-forming apparatus during the visit of a service engineer after the management server has once requested the service engineer to perform a maintenance work, the management server can transmit such an additional request together with information useful for maintenance to the image-forming apparatus. In this case, the management server can notify a service engineer of such an additional request by clearly displaying it as detailed information on the screen illustrated in FIG. 26.

Fourth Embodiment

According to a fourth embodiment of the present invention, the image-forming apparatus 101 notifies the management server 105 of failure information and performs an error analysis operation.

Figure 36:
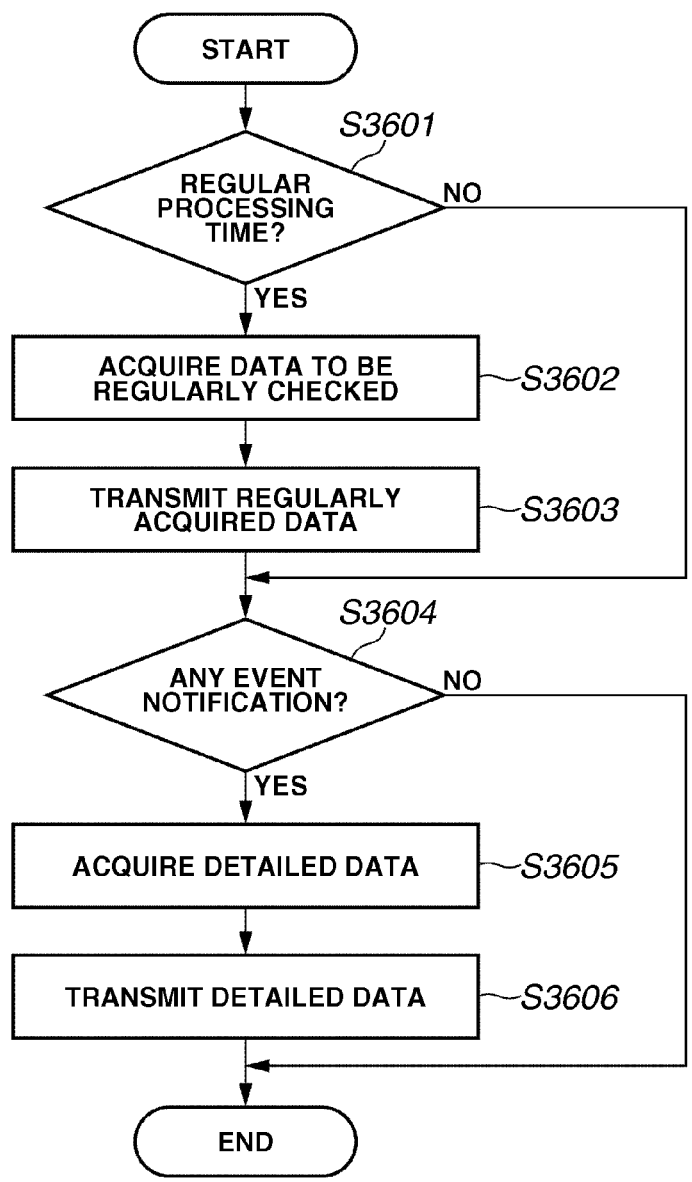
FIG. 36 is a flowchart illustrating an example operation performed by an image-forming apparatus, which executes an image-forming apparatus supervisory program, according to an embodiment of the present invention.

FIG. 36 is a flowchart illustrating an example operation performed by the image-forming apparatus 101, which executes an image-forming apparatus supervisory program, according to an embodiment. The processing according to the image-forming apparatus supervisory program can be periodically or constantly performed. When the processing is performed periodically, the processing takes place at predetermined times, referred to hereinafter as regular processing times.

In step S3601, the image-forming apparatus supervisory program refers to a regular processing time stored in the storage unit 406 and compares the regular processing time with the present time. If the image-forming apparatus supervisory program determines that the regular processing time accords with the present time (YES in step S3601), the processing proceeds to step S3602. If the image-forming apparatus supervisory program determines that the regular processing time does not accord with the present time (NO in step S3601), the processing proceeds to step S3604.

In step S3602, the image-forming apparatus supervisory program acquires the number of printed sheets or any other information that serves as an object to be regularly transmitted. In step S3603, the image-forming apparatus supervisory program converts the information acquired in step S3602 into a format illustrated in FIG. 37A and transmits the formatted data to the management server 105.

The format of transmission data includes transmission data type (postPrintOutCounter), transmission image-forming apparatus identification information (serialNumber), and transmission date/time (timeStamp). In step S3604, the image-forming apparatus supervisory program determines whether the controller 502 has notified any event (e.g., occurrence of a failure or any change in status).

If the image-forming apparatus supervisory program determines that the controller 502 has notified an event (YES in step S3604), the processing proceeds to step S3605. If the controller 502 has not notified any event (NO in step S3604), the image-forming apparatus supervisory program terminates the processing of this routine. In step S3605, the image-forming apparatus supervisory program acquires detailed information about an event (occurred failure or changed status) from the controller 502. In step S3606, the image-forming apparatus supervisory program converts the information acquired in step S3605 into a format illustrated in FIG. 37B and transmits the formatted data to the management server 105.

The format of transmission data includes transmission data type (postErrorInformation), transmission image forming apparatus identification information (serialNumber), failure occurrence time (occurenceTime), failure revert status (revertState), failure revert date/time (revertTime), number of printed sheets at failure occurrence time (totalCount), error type (errorType), error code (code), detailed error code (subcode), error occurrence position (position), and transmission date/time (timeStamp). The failure status (failure revert status (revertState)) "1" indicates that the system has not yet recovered from the failure. The failure status "2" indicates that the system has completely recovered from the failure. When the system has not yet recovered from the failure, the failure revert date/time is an invalid date/time. The error type "1" indicates that the transmission data is information relating to a failure. The error type "2" indicates that the transmission data is information relating to a status change.

Figure 38:
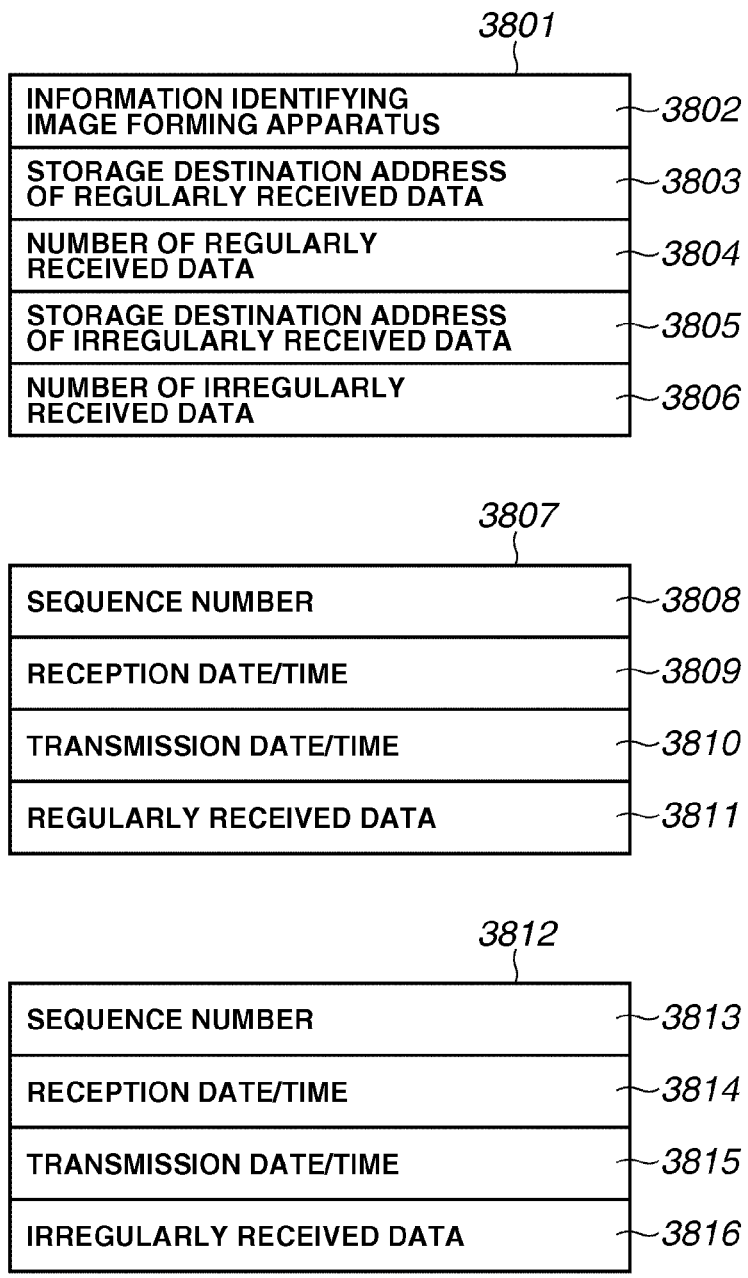
FIG. 38 illustrates an example storage format of image-forming apparatus information stored in the management server according to an embodiment of the present invention.

FIG. 38 illustrates an example storage format for image-forming apparatus information that the management server 105 stores in the storage unit 208. The example format illustrated in FIG. 38 includes an information management table 3801 for each image-forming apparatus managed by the management server 105. The information management table 3801 includes a field 3802 that indicates information identifying an image-forming apparatus, which is a serial number (serialNumber) according to this embodiment.

The information management table 3801 includes a field 3803 indicating an address of a table (storage format) 3807 that stores data received regularly from the image-forming apparatus, a field 3804 indicating the number of data received regularly from the image-forming apparatus, a field 3805 indicating an address of a table (storage format) 3812 that stores data received irregularly from the image-forming apparatus (more specifically, failure information, status change information, etc.), and a field 3806 indicating the number of data received irregularly from the image-forming apparatus.

The storage format 3807 illustrated in FIG. 38 is applicable to the data received regularly from the image-forming apparatus. The storage format 3807 includes a field 3808 indicating a sequence number of received data, which is incremented by one (1, 2, 3, . . . ) each time the data is newly received. Furthermore, the storage format 3807 includes a field 3809 indicating reception date/time of the data received by the management server 105, a field 3810 indicating transmission date/time of the data transmitted by the image-forming apparatus 101, and a field 3811 indicating details (transmission data type, counter value, etc.) of the received data.

The storage format 3812 illustrated in FIG. 38 is applicable to the data received irregularly from the image-forming apparatus. The storage format 3812 is a field 3813 indicating a sequence number of received data, which is incremented by one (1, 2, 3, . . . ) each time the data is newly received. Furthermore, the storage format 3812 includes a field 3814 indicating reception date/time of the data received by the management server 105, a field 3815 indicating date/time of the data transmitted by the image-forming apparatus 101, and a field 3816 indicating details (failure occurrence date/time, code, subcode, etc.) of the received data.

Figure 39:
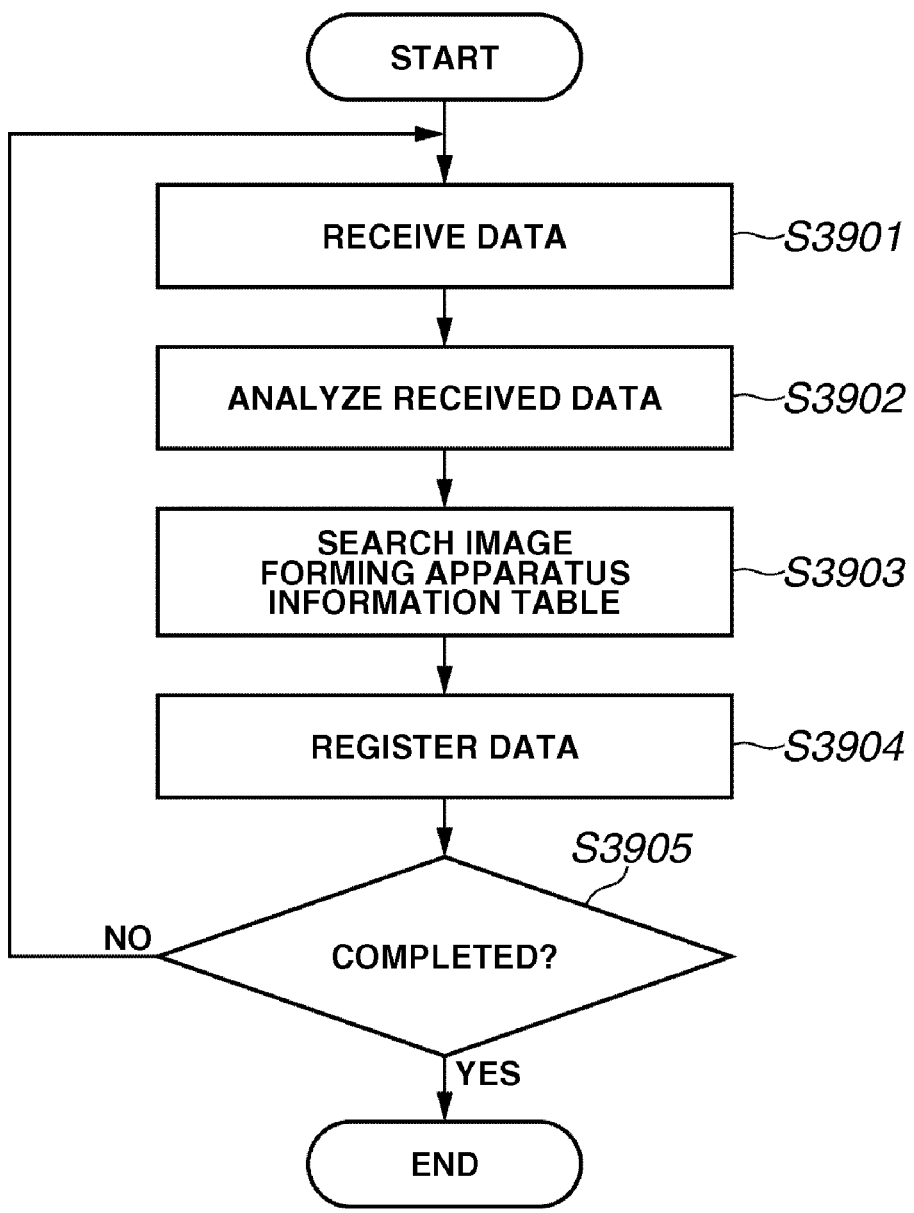
FIG. 39 is a flowchart illustrating an example operation performed by the management server, which executes an management program, according to an embodiment of the present invention.

FIG. 39 is a flowchart illustrating an example operation performed by the management server 105, which executes the management program 304 for receiving data from an image-forming apparatus. In step S3901, the management program 304 receives the data illustrated in FIG. 37 from the image-forming apparatus 101 and stores the reception data into the RAM 204. In step S3902, the management program 304 extracts identification information (e.g., serialNumber and data type) of the image-forming apparatus from the received data stored in the RAM 204.

In step S3903, the management program 304 compares the information serialNumber extracted in step S3902 with the image-forming apparatus identification information 3802 on the information management table 3801, and searches a corresponding table based on a comparison result. In step S3904, the management program 304 performs registration processing according to the data type.

If the data type extracted in step S3902 is postPrintOut-Counter, the management server 105 determines that the reception data is regularly received data and increments the regularly received data storage number 3804. Next, the management server 105 stores the regularly received data in the storage format 3807 with reference to the regularly received data storage destination address 3803 and the address obtained from the regularly received data storage number 3804.

More specifically, the regularly received data storage number 3804 is set to the sequence number 3808. The reception date/time of the data received by the management server 105 is set to the reception date/time 3809. The transmission date/time of the data transmitted by the image-forming apparatus 101 (i.e., date/time data inserted between timestamp tags included in the reception data) is set to the transmission date/time 3810. Any numerical value (or character string) indicating information relating to the number of printed sheets is set to the regularly received data 3811. According to this embodiment, the number of printed sheets is 15960.

If the data type extracted in step S3902 is postErrorInformation, the management server 105 determines that the received data is irregularly received data and increments the irregularly received data storage number 3806. Next, the management server 105 stores the irregularly received data in the format 3812 with reference to the regularly received data storage destination address 3805 and the address obtained from the irregularly received data storage number 3806.

More specifically, the irregularly received data storage number 3806 is set to the sequence number 3813. The reception date/time of the data received by the management server 105 is set to the reception date/time 3814. The transmission date/time of the data transmitted by the image-forming apparatus 101 (i.e., date/time data inserted between timestamp tags included in the reception data) is set to the transmission date/time 3815. Any numerical value (or character string) indicating information relating to the failure including the occurrence date/time (occurrenceTime), such as 2007-02-13T13:39:00.000Z, is set to the irregularly received data 3816.

According to this embodiment, the revert state (revertState) is set to "1", which indicates that the system has not yet recovered from the failure. The revert date/time (revertTime) is set to 1970-01-01T00:00:00.000Z, which is an invalid date/time. The number of printed sheets at failure occurrence time (totalCount) is set to 15950. The information type (errorType) is set to "1", which indicates occurrence of a failure. The failure identification information (code) is set to 1344, which corresponds to 540 according to the hexadecimal notation. The detailed failure information (subcode) is set to 8001. In step S3905, the management program 304 determines whether a completion instruction is present. If the completion instruction is present (YES in step S3905), the program terminates the processing of this routine. If there is not any completion instruction (NO in step S3905), the processing returns to step S3901.

Figure 40:
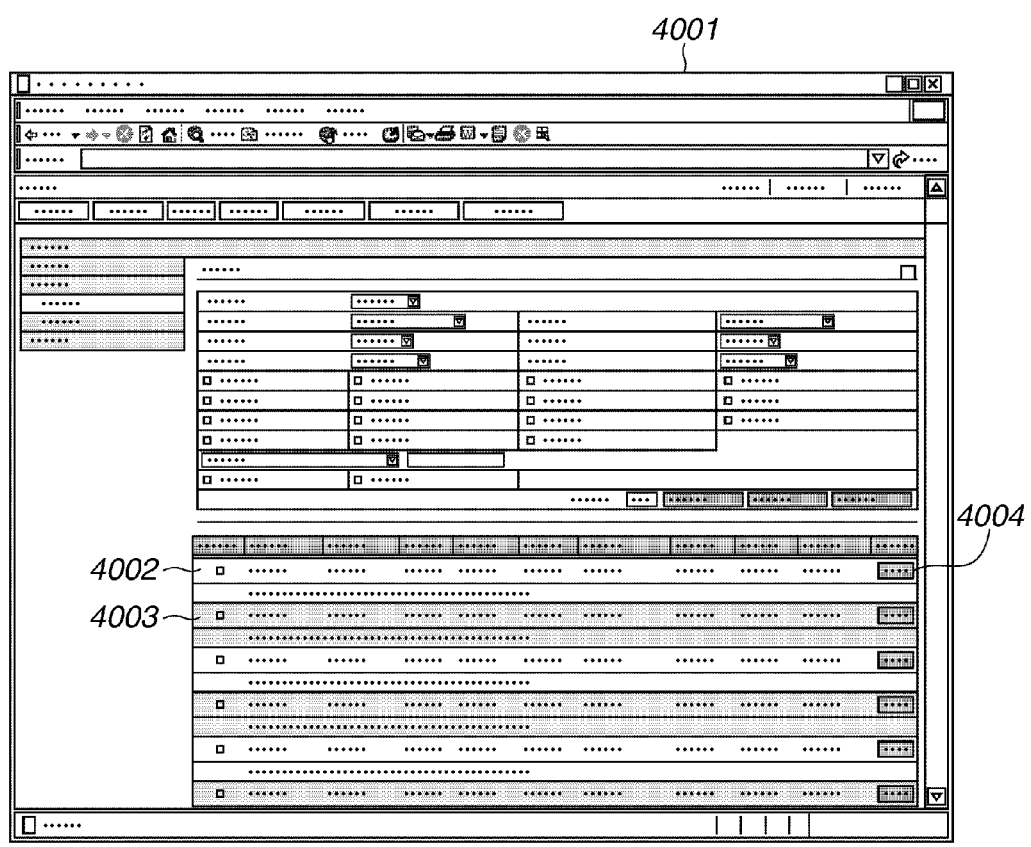
FIG. 40 illustrates an example failure list screen provided by the management server according to an embodiment of the present invention.

FIG. 40 illustrates an example failure list screen provided by the management server 105. The management program 304 of the management server 105 generates a screen 4001 with reference to data 3801 and 3812 stored in the storage unit 208. The screen 4001 includes sales division name, condition designation buttons for searching for data to be displayed, a field 4002, a field 4003, and a button 4004.

The field 4002 displays data transmission date/time, client name, supervisory apparatus identifier, supervisory image-forming apparatus identifier, data type, client information (contract type), failure resolved status, and identification number enabling the management server 105 to identify failure information.

The field 4003 display a character string, such as "paper surface detection is failed during an operation of the stack tray", which describes the content of each failure. If a user clicks on the button 4004 with a mouse button or the like, a detailed failure information screen 4101 (FIG. 41) is displayed.

Figure 41:
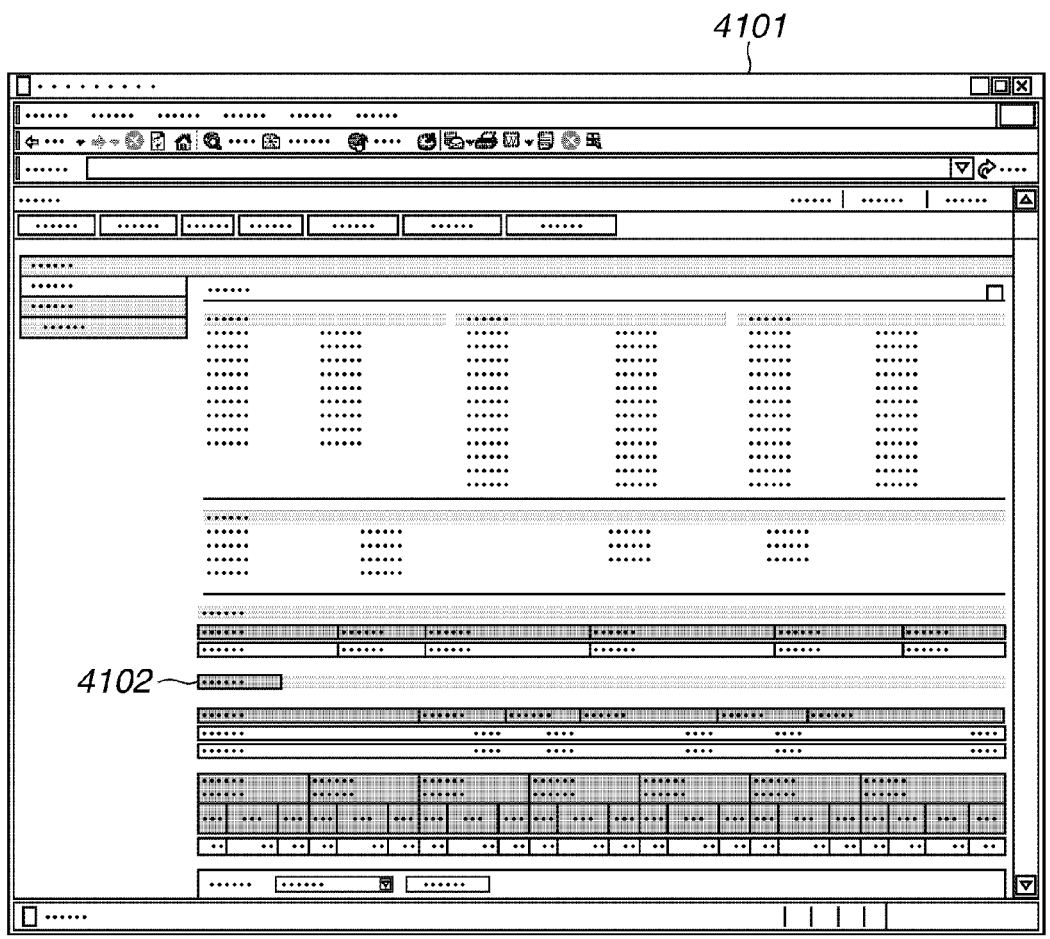
FIG. 41 illustrates an example failure details screen provided by the management server according to an embodiment of the present invention.

FIG. 41 illustrates an example of the detailed failure information screen 4101 provided by the management server 105 when a user clicks on the button 4004 illustrated in FIG. 40. The management program 304 of the management server 105 generates the detailed failure information screen 4101 with reference to data 3801 and 3812 stored in the storage unit 208 as well as client information of the image-forming apparatus stored in the storage unit 208. If a user clicks on a button 4102, the management program 304 of the management server 105 executes failure analysis processing and displays an execution result on a failure analysis result screen 4201 (FIG. 42).

Figure 42:
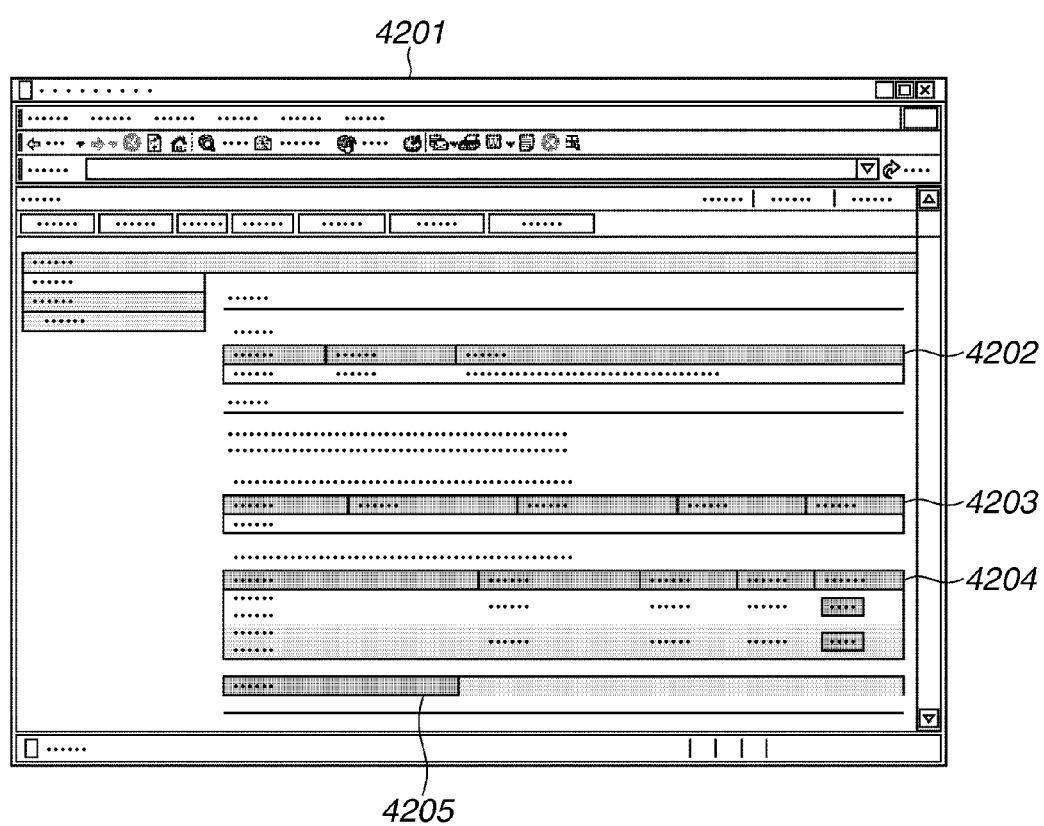
FIG. 42 illustrates an example failure analysis result screen provided by the management server according to an embodiment of the present invention.

FIG. 42 illustrates an example of the failure analysis result screen 4201 provided by the management server 105 when a user clicks on the 4102 illustrated in FIG. 41. A field 4202 displays error code, error details, and cause of error. According to this embodiment, there are two resolution method candidates. A field 4203 displays the first resolution method candidate, and a field 4204 displays the second resolution method candidate. If a user clicks on a button 4205, the management server 105 sends to a service engineer an electric mail that notifies the display content including identification information of the client and the image-forming apparatus as well as data in the fields 4202, 4203, and 4204.

FIG. 43 illustrates an example failure resolution method table that the management server 105 stores in the storage unit 208. The number of codes 4301 represents the number of code/subcode combinations that can identify a failure stored in the management server 105. A table 4302 stores the entry of number of codes 4301. According to this embodiment, a code 4303 is 540 and a subcode 4304 is 8001. A countermeasure table start number 4305 is 1, which is information indicating the field number on a table 4307 in which a resolution method for the failure identified by the code 540 and the subcode 8001 is described.

A countermeasure table entry number 4306 is information indicating the total number of resolution methods applicable to the failure identified by the code 540 and the subcode 8001. The resolution method candidate table 4307 includes sequence number 4308, character string indicating resolution method 4309, replacement parts 4310 (parts code or parts name), and phenomenon 4311 (state of image-forming apparatus to which the resolution method is applied). For example, the phenomenon 4311 stores an operational history of an image-forming apparatus having been failed, parts counter information representing frequency in parts replacement, or other information.

Figure 44:
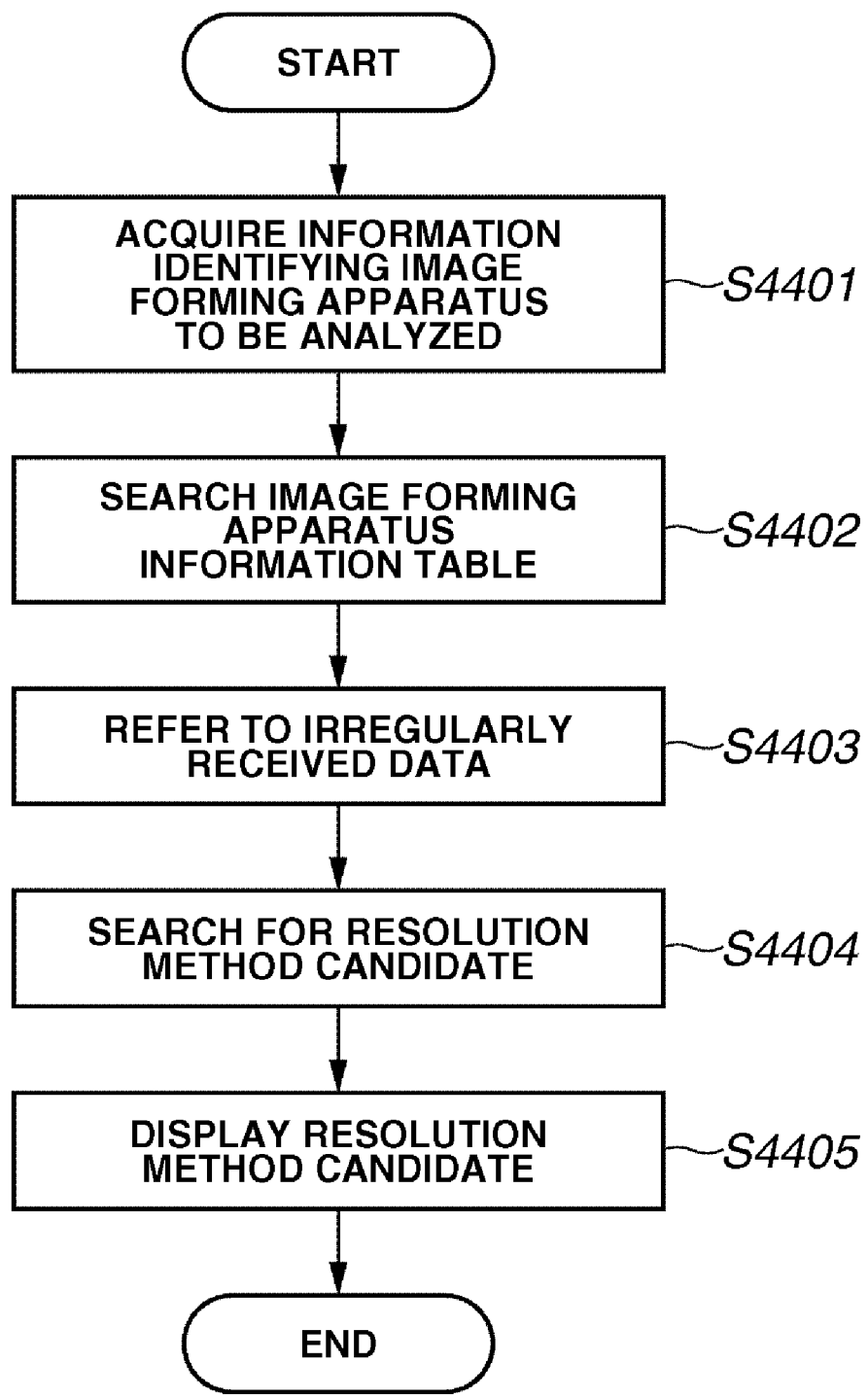
FIG. 44 is a flowchart illustrating a failure analysis operation performed by the management server according to an embodiment of the present invention.

FIG. 44 is a flowchart illustrating an example failure analysis operation performed by the management server 105, which executes the management program 304.

The management server 105 starts the failure analysis operation when a user clicks on the button 4102. In step S4401, the management program 304 acquires information identifying an image-forming apparatus to be analyzed (object of failure analysis). In step S4402, the management program 304 searches the information management table 3801 corresponding to the image-forming apparatus identification information acquired in step S4401.

In step S4403, the management program 304 refers to the data 4301, 4302, 4307, 3807, and 3812 and then refers to the phenomenon associated with a resolution method corresponding to the code and subcode in the table 4302. Next, the management program 304 refers to the failure and the status registered in the data 3812 and, if necessary, refers to the parts counter value or other information registered in the data 3807. The management program 304 selects a resolution method candidate, which is relevant to the phenomenon that accords with the information obtained by referring to the data 3812 and 3807. If there is no matching in the phenomenon, it is useful to set any other replaceable conditions to determine a resolution method candidate. In step S4405, the management program 304 generates display data for the resolution method selected in step S4404.

As described above, an embodiment can provide a management server handling the display and notification about tools and parts necessary for a service engineer who works for maintenance at the location where a failed image-forming apparatus is located.

Other Embodiment

The present invention can be applied to a system including plural devices or can be applied to a single apparatus. For example, the present invention can be applied to a computer system that includes a printer, a facsimile, a personal computer (PC), a server, and a client.

Furthermore, software program code for realizing the functions of the above-described embodiments can be supplied to a system or an apparatus including various devices. A computer (or CPU or micro-processing unit (MPU)) in the system or the apparatus can execute the program to operate the devices to realize the functions of the above-described embodiments.

Accordingly, the present invention encompasses the program code installable on a computer when the functions or processes of the embodiments can be realized by the computer. In this case, the program code itself can realize the functions of the embodiments.

The equivalents of programs can be used if they possess comparable functions. In this case, the type of program can be any one of object code, interpreter program, and OS script data.

Furthermore, the present invention encompasses supplying program code to a computer with a storage (or recording) medium storing the program code. A storage medium supplying the program can be selected from any one of a floppy disk, a hard disk, an optical disk, a magneto-optical (MO) disk, a compact disc-ROM (CD-ROM), a CD-recordable (CD-R), a CD-rewritable (CD-RW), a magnetic tape, a nonvolatile memory card, a ROM, and a DVD (DVD-ROM, DVD-R).

The method for supplying the program includes accessing a web site on the Internet using the browsing function of a client computer (information-processing apparatus), when the web site allows each user to download the computer program of the present invention, or compressed files of the programs having automatic installing functions, to a hard disk or other recording medium of the user. Furthermore, the program code constituting the programs of the present invention can be divided into a plurality of files so that respective files are downloadable from different web sites. Namely, the present invention encompasses World Wide Web (WWW) servers that allow numerous users to download the program files so that the functions or processes of the present invention can be realized on their computers.

Enciphering the programs of the present invention and storing the enciphered programs on a CD-ROM or comparable recording medium is a method when the programs of the present invention are distributed to the users. The authorized users (i.e., users satisfying predetermined conditions) are allowed to download key information from a page on the Internet. The users can decipher the programs with the obtained key information and can install the programs on their computers. When the computer reads and executes the installed programs, the functions of the above-described embodiments can be realized.

Moreover, an operating system (OS) or other application software running on a computer can execute part or the whole of actual processing based on instructions of the programs.

Additionally, the program code read out of a storage medium can be written into a memory of a function expansion board equipped in a computer or into a memory of a function expansion unit connected to the computer. In this case, based on an instruction of the program, a CPU provided on the function expansion board or the function expansion unit can execute part or the whole of the processing so that the functions of the above-described embodiments can be realized.

While the present invention has been described with reference to embodiments, it is to be understood that the invention is not limited to the disclosed embodiments. The scope of the following claims is to be accorded the broadest interpretation so as to encompass all modifications, equivalent structures, and functions.

This application claims priority from Japanese Patent Application No. 2007-152705 filed Jun. 8, 2007 and Japanese Patent Application No. 2007-265575 filed Oct. 11, 2007, which are hereby incorporated by reference herein in their entirety.

What is claimed is:

1. An image forming apparatus that communicates via a network with a management server which manages identification information of the image forming apparatus and information regarding the image forming apparatus and that has a web browser, the image forming apparatus comprising:

sending means for sending a menu request including the identification information of the image forming apparatus;

reception means for receiving a response to the menu request from the management server via the network;

execution means for analyzing and executing, when the response to the menu request has been received by the reception means, a processing command that is included in contents of the response;

generation means for generating a display file, which is generated by embedding both a part of the contents of the response to the menu request having been received by the reception means and a processing result of the processing command that has been executed by the execution means; and display means for displaying the display file generated by the generation means via the web browser, wherein, when the display file that is to be displayed by the display means is generated by the generation means, information that was held by the image forming apparatus at a time of execution of the processing command is embedded as the processing result of the processing command into the display file, and wherein, when a processing command for embedding information held by the image forming apparatus is not included in the response from the management server, the display means performs a display according to the contents of the response via the web browser without embedding information held by the image forming apparatus.

2. The image forming apparatus according to claim 1, wherein the image forming apparatus and the management server are connected to each other via a firewall, and the management server performs communication with the image forming apparatus, which is protected by the firewall, to make a response to the menu request that has been sent by the sending means.

3. The image forming apparatus according to claim 1, wherein the contents of the response to the menu request include the information regarding the image forming apparatus that is managed by the management server and that is included in the menu request.

4. The image forming apparatus according to claim 1,
wherein information that is obtained by executing the processing command with the execution means is operation information concerning operation of the image forming apparatus at the time of execution of the processing command, and
wherein the operation information is information that changes in accordance with an image forming procedure which is performed by the image forming apparatus, and is information including at least one of a counter value and an operation log.

5. The image forming apparatus according to claim 1,
wherein the display means displays maintenance information concerning maintenance of the image forming apparatus on the basis of the generated display file, and further displays a control screen to which a maintenance result is able to be input by a user, and,
wherein the image forming apparatus further comprises creating means for creating a work report on the basis of a maintenance result that has been input by the user via the display means.

6. The image forming apparatus according to claim 5,
wherein the display means further displays a control screen in which a maintenance result is able to be selected from among candidates and to which the maintenance result is able to be input by a user, and
wherein the creating means creates a work report on the basis of a maintenance report that has been selected and input by the user via the display means.

7. The image forming apparatus according to claim 5, wherein the creating means creates a work report on the basis of trouble information concerning a trouble that occurs in the image forming apparatus and input information concerning an input indicating whether or not the trouble information has been dealt with.

8. The image forming apparatus according to claim 5, wherein the maintenance result that is input by the user includes at least one of information concerning a reason why the user has reported for duty, information concerning work details, information concerning exchanged components, and information concerning a reason why components have been exchanged for each other.

9. The image forming apparatus according to claim 1, wherein the display means performs, on the basis of the response that has been received by the receiving means, display of a list of pieces of trouble information concerning troubles that occur in the image forming apparatus and display of information indicating whether or not each of the pieces of trouble information has been dealt with.

10. An information processing method for an image forming apparatus that communicates via a network with a management server which manages identification information of the image forming apparatus and information regarding the image forming apparatus and that has a web browser, the information processing method comprising:

a sending step of sending a menu request including the identification information of the image forming apparatus;

a reception step of receiving a response to the menu request from the management server via the network;

an execution step of analyzing and executing, when the response to the menu request has been received in the reception step, a processing command that is included in contents of the response;

a generating step of generating a display file, which is generated by embedding both a part of the contents of the response to the menu request having been received in the reception step and a processing result of the processing command that has been executed by the execution step; and a display step of displaying the display file generated in the generating step via the web browser, wherein, when the display file that is to be displayed in the display step is generated in the generating step, information that was held by the image forming apparatus at a time of execution of the processing command is embedded as the processing result of the processing command into the display file, and wherein, when a processing command for embedding information held by the image forming apparatus is not included in the response from the management server, a display according to the contents of the response via the web browser without embedding information held by the image forming apparatus is displayed.

11. A computer readable storage medium on which is stored a computer program for making a computer execute a method for an image forming apparatus that communicates via a network with a management server which manages identification information of the image forming apparatus and information regarding the image forming apparatus and that has a web browser, the method comprising:

a sending step of sending a menu request including the identification information of the image forming apparatus;

a reception step of receiving a response to the menu request from the management server via the network;

an execution step of analyzing and executing, when the response to the menu request has been received in the reception step, a processing command that is included in contents of the response; and a display step of displaying a display file, via the web browser, the display file being generated by embedding a processing result of the processing command that has been executed in the execution step in the contents of the response to the menu request, the response to the menu request having been received in the reception step, wherein, when a generation file that is to be displayed in the display step is generated, information that was held by the image forming apparatus at a time of execution of the processing command is embedded as the processing result of the processing command, and wherein, when a processing command for embedding information held by the image forming apparatus is not included in the response from the management server, a display according to the contents of the response via the web browser without embedding information held by the image forming apparatus is displayed.

12. A system comprising:

a management server that manages a piece of information regarding an image forming apparatus; and the image forming apparatus that is connected via a network to the management server and that has a web browser, the management server including management means for managing the piece of information regarding the image forming apparatus that is not held by the image forming apparatus, and response means for making a response, the response including the piece of information regarding the image forming apparatus, to a menu request, the menu request being received from the image forming apparatus, for the image forming apparatus that has made the menu request, the piece of information regarding the image forming apparatus corresponding to identification information of the image forming apparatus and being managed by the management means, the image forming apparatus including sending means for sending the menu request including the identification information of the image forming apparatus, reception means for receiving the response to the menu request from the management server via the network, execution means for analyzing contents of the response to the menu request, the response to the menu request having been received by the reception means, and for executing a processing command that is included in the response in order to obtain information concerning itself that is not managed by the management server, and display means for displaying a display file, via the web browser, the display file being generated by embedding a processing result of the processing command that has been executed by the execution means in the contents of the response to the menu request, the response to the menu request having been received by the reception means, wherein, when a generation file that is to be displayed by the display means is generated, information that was held by the image forming apparatus at a time of execution of the processing command is embedded as the processing result of the processing command, and the display means of the image forming apparatus displays pieces of information regarding the image forming apparatus in combination, each of the management server and the image forming apparatus separately managing a corresponding one of the pieces of information regarding the image forming apparatus, and wherein, when a processing command for embedding information held by the image forming apparatus is not included in the response from the management server, the display means performs a display according to the contents of the response via the web browser without embedding information held by the image forming apparatus.

13. The system according to claim 12, wherein the piece of information regarding the image forming apparatus that is managed by the management server and that is not held by the image forming apparatus includes history information concerning a history of the image forming apparatus or a method for dealing with a trouble that occurs in the image forming apparatus, and the information concerning itself that is held by the image forming apparatus and that is not managed by the management server includes latest counter information or a status of the image forming apparatus.

* * * * *